United States Patent
Furuta et al.

(10) Patent No.: US 7,272,792 B2
(45) Date of Patent: Sep. 18, 2007

(54) KANA-TO-KANJI CONVERSION METHOD, APPARATUS AND STORAGE MEDIUM

(75) Inventors: Takashi Furuta, Kawasaki (JP); Shin-ichi Nojima, Kawasaki (JP); Hideki Ushigome, Kawasaki (JP); Shouji Iwamoto, Kawasaki (JP); Aya Yamaguchi, Kawasaki (JP); Haruhito Homma, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 310 days.

(21) Appl. No.: 10/767,455

(22) Filed: Jan. 30, 2004

(65) Prior Publication Data

US 2004/0268256 A1    Dec. 30, 2004

(30) Foreign Application Priority Data

Jan. 30, 2003  (JP) .............................. 2003-021621
Jul. 28, 2003  (JP) .............................. 2003-280763

(51) Int. Cl.
*G06F 17/00* (2006.01)
(52) U.S. Cl. ...................................... 715/535; 715/536
(58) Field of Classification Search ................ 715/535, 715/536, 703, 780
See application file for complete search history.

(56) References Cited

U.S. PATENT DOCUMENTS 5,999,951 A * 12/1999 Shibuya ...................... 715/536
6,003,050 A * 12/1999 Silver et al. .................. 715/536
2003/0182103 A1* 9/2003 Atkin ............................. 704/9

FOREIGN PATENT DOCUMENTS

JP           07-129572           5/1995

OTHER PUBLICATIONS

Elias, "A complete introduction to Japanese character encodings," Nov. 2, 2003 http://www.cs.mcgill.ca/~aelias4/encodings.html.*
Typing Different Languages into Computer Systems: A Brief Tutorial Nov. 2002 www.verisign.com/static/002531.pdf.*

* cited by examiner

*Primary Examiner*—Stephen Hong
*Assistant Examiner*—Adam M Queler
(74) *Attorney, Agent, or Firm*—Staas & Halsey LLP

(57) ABSTRACT

A start-up processing unit of a server sends to a client a character inputting web-page and a program of applications that the server handles concurrently. After converting reading information of an input character string received from the client and for which an operating character code is designated, into kanji character strings of an intermediate code and an operating character code, a kana-to-kanji conversion unit creates a candidate list of a kanji character string consisting of character images of the operating character code and the intermediate code, sends the candidate list to the client together with a candidate selection program and causes the client to select a candidate character string of kanji. An editing/outputting unit receives the operating character code of a character string containing the selected kanji candidate from the client and transfers it to a corresponding operation system.

13 Claims, 32 Drawing Sheets

FIG. 3

Table 46:

| READING | TYPE | NOTATION | INTERMEDIATE CODE |
|---|---|---|---|
| A | NOUN | 亜 | 00000122 |
| YOSHI | NOUN | 余資 | 00000067,00000089 |
| YOSHIDA | NAME | 吉田 | 00000012,00000024 |
| YOSHIDA | NAME | 吉田 | 00000013,00000024 |
| YOSHIDA | NAME | 芳田 | 00000015,00000024 |
| YOSHIDA | NAME | 葭田 | 00000018,00000024 |
| YOSHIZU | NAME | 吉津 | 00000012,00000046 |

Table 48:

| INTERMEDIATE CODE | CHARACTER | SJIS | JEF | OTHERS |
|---|---|---|---|---|
| 00000001 | あ | 1234 | 2345 | 00000122 |
| 00000012 | 吉 | 1423 | 2573 | 00000067,00000089 |
| 00000013 | 吉 |  | 7354 | 00000012,00000024 |
| 00000014 | 由 | 3543 | 6211 | 00000013,00000024 |
| 00000015 | 芳 | 1899 | 6214 | 00000015,00000024 |
| 00000016 | 葦 | 5058 | 1735 | 00000018,00000024 |
| 00000017 | 佳 | 5342 | 9354 | 00000012,00000046 |

FIG. 5

TO MAYOR OF "A" CITY

APPLICATION FOR XXX

NAME

ADDRESS

OBJECTIVE OF USE

TRANSMIT   CANCEL

| ATTRIBUTE | DESCRIPTION |
|---|---|
| EDITABLE FLAG | A NORMAL INPUT FIELD FOR "TRUE" AND A FIXED CHARACTER DISPLAY FIELD FOR "FALSE". |
| NAME OF ITEM | NAME OF ITEMS WHEN FORM IS TRANSMITTED. |
| DOUBLE INDEX | AMOUNT OF INDEX |
| INSCRIBED TEXT | CHARACTER LINE DISPLAYED FOR A NON-EDITABLE CASE AND DEFAULT INPUT CHARACTER LINE FOR AN EDITABLE CASE. |
| DICTIONARY TYPE | A KANA-TO-KANJI DICTIONARY SUCH AS A NAME DICTIONARY AND AN ADDRESS DICTIONARY IS DESIGNATED. |
| INPUTTED FONT SIZE | FONT SIZE TO BE DISPLAYED OF INPUTTED CHARACTER LINES IS DESIGNATED. |
| LISTED FONT SIZE | FONT SIZE OF CANDIDATE CHARACTERS DISPLAYED AS A CONVERSION LIST IS DESIGNATED. |
| SETTING OF LONGEST CHARACTER LINE LENGTH | LONGEST CHARACTER LENGTH CAPABLE OF BEING INPUTTED IS DESIGNATED. |
| GRID DISPLAYED | WHETHER GRID IS DISPLAYED OR NOT IS DESIGNATED. |
| CHARACTER CODE | CODE SYSTEM TO BE OUTPUTTED IS DESIGNATED. |

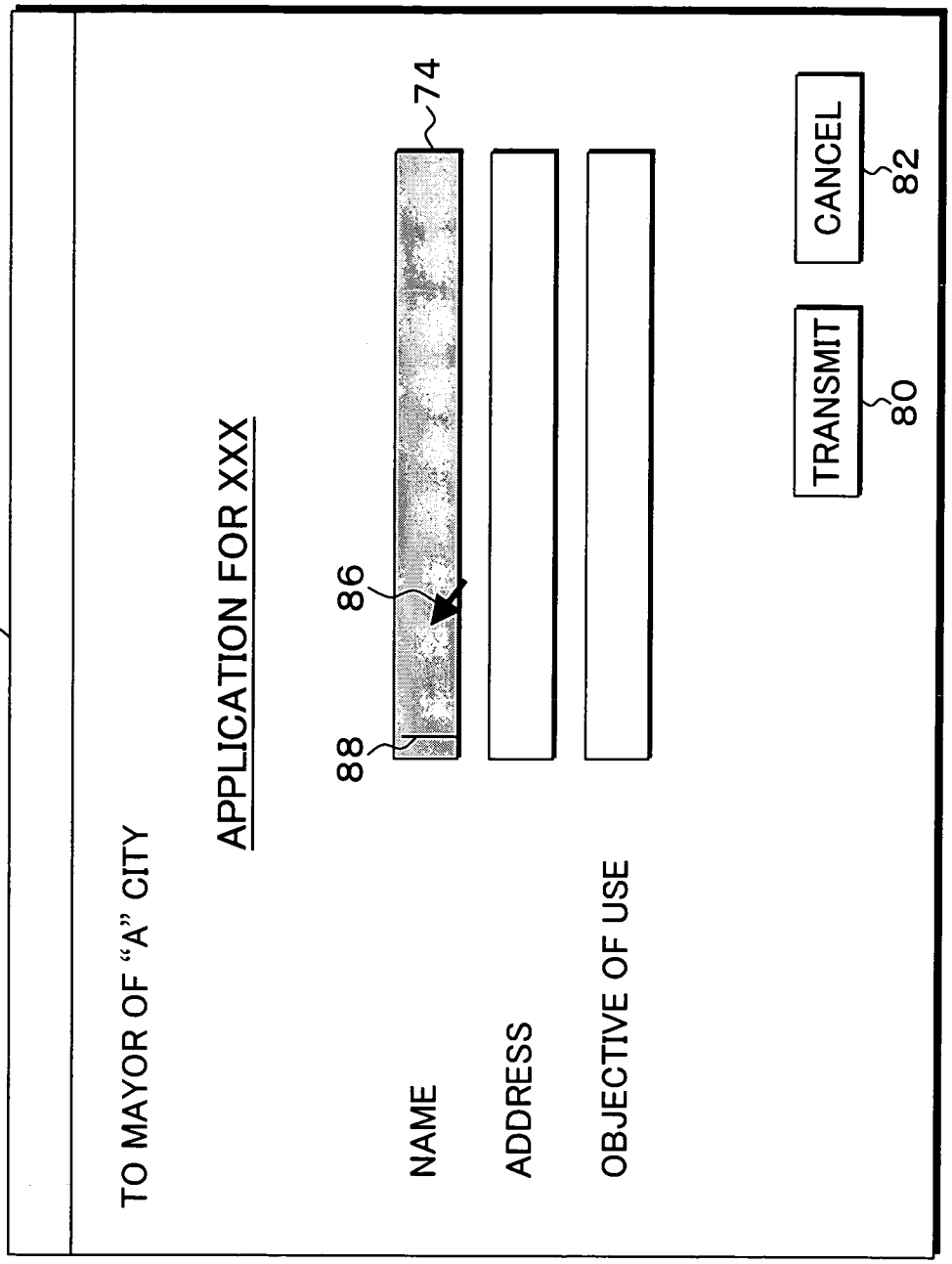

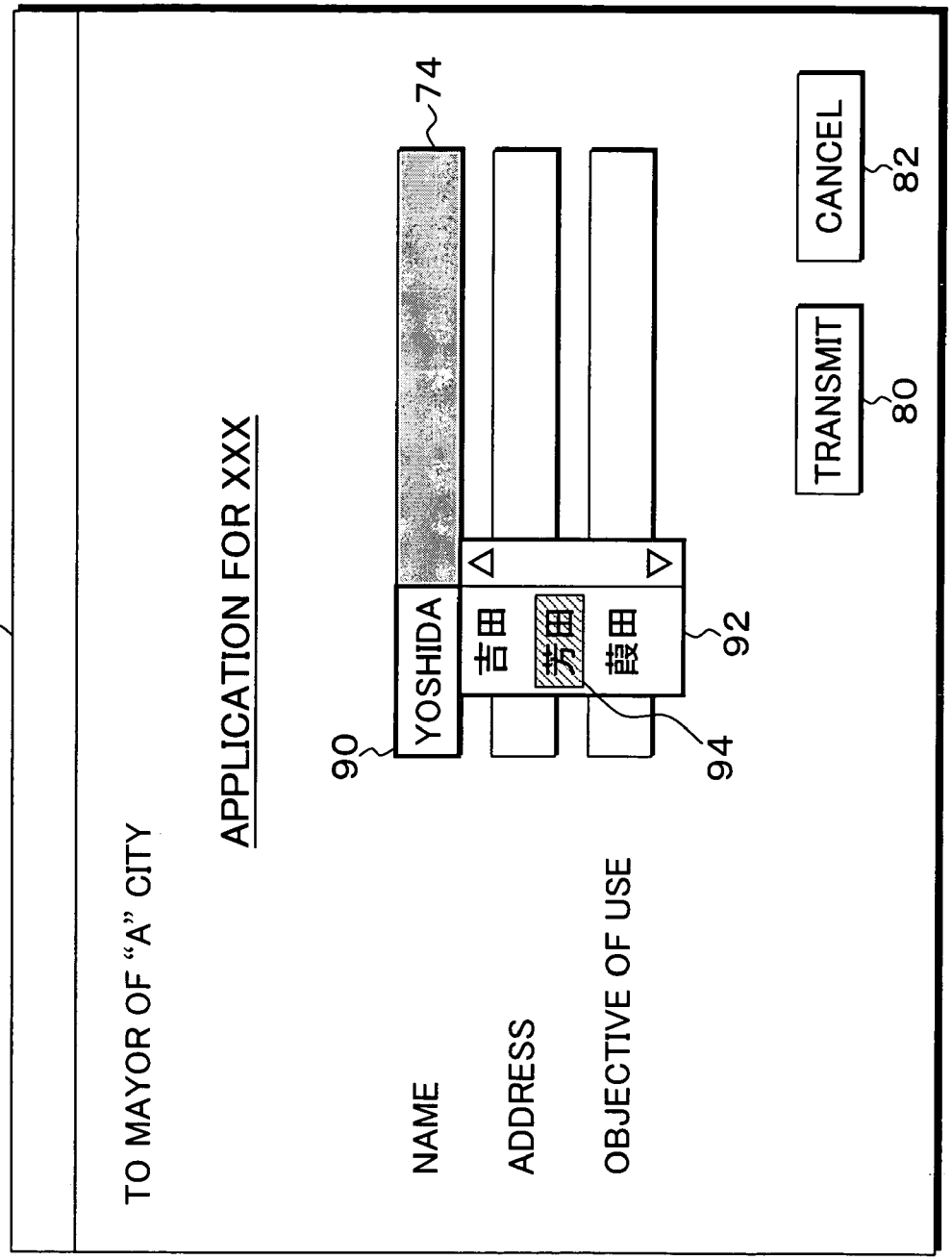

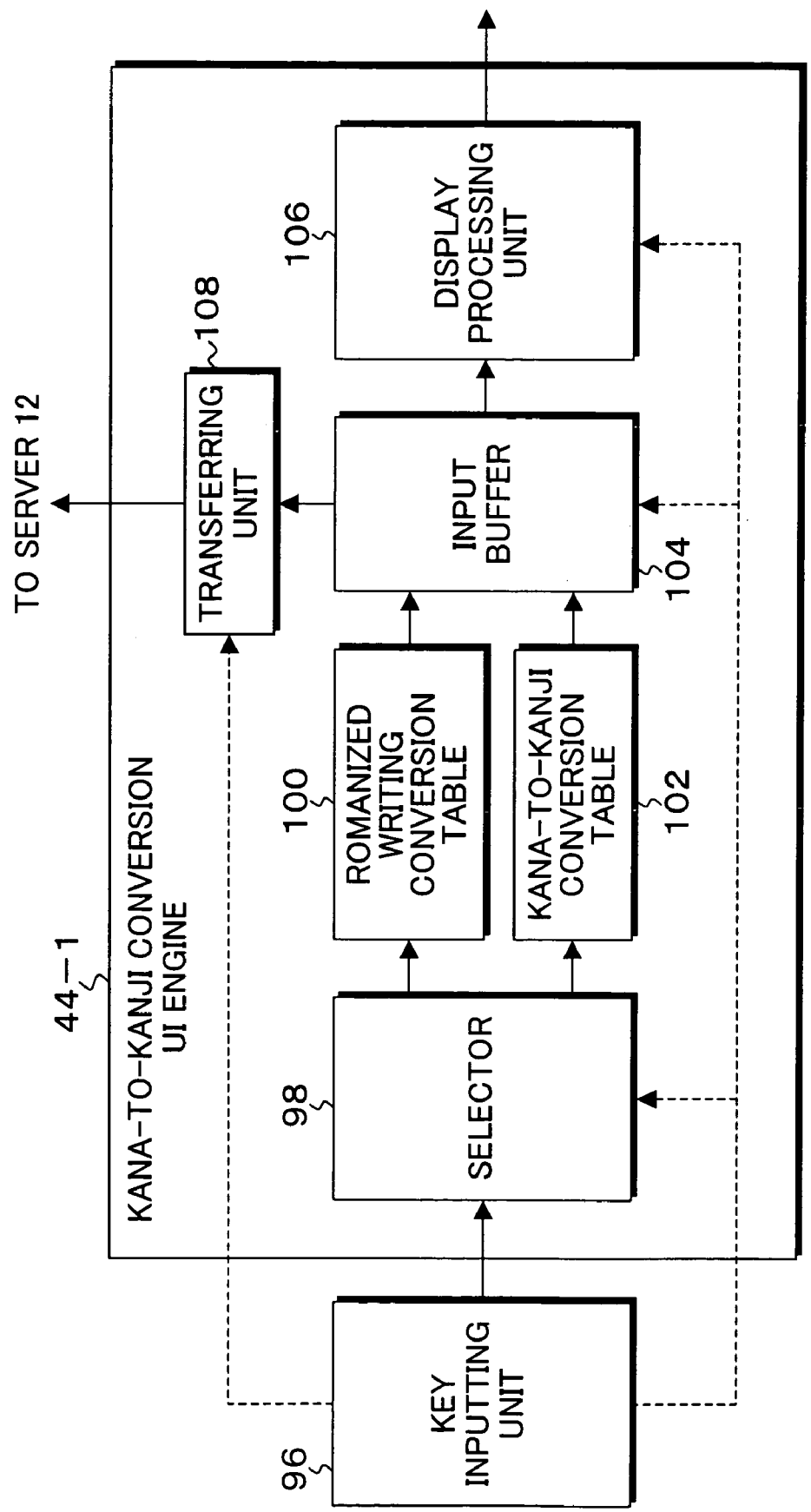

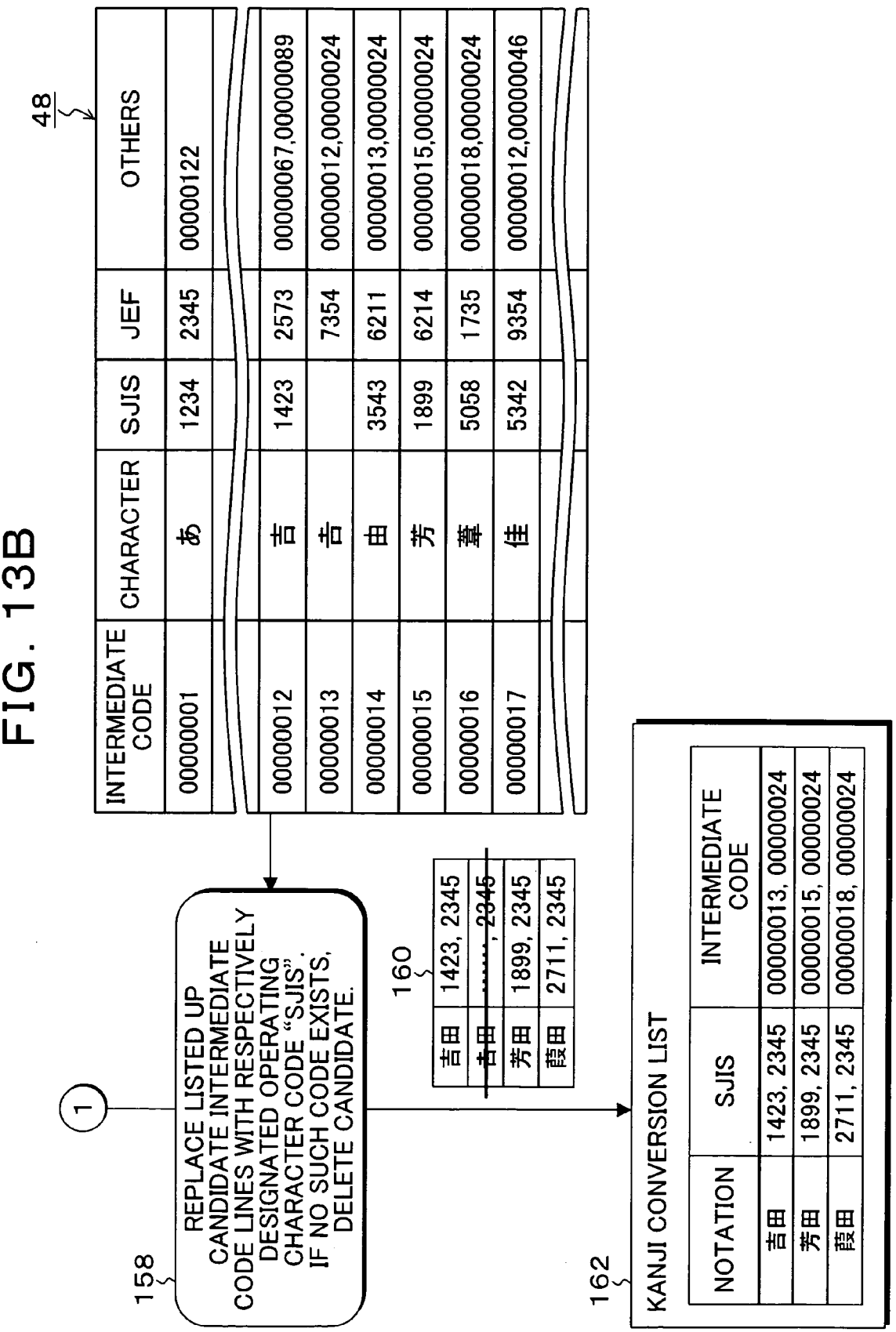

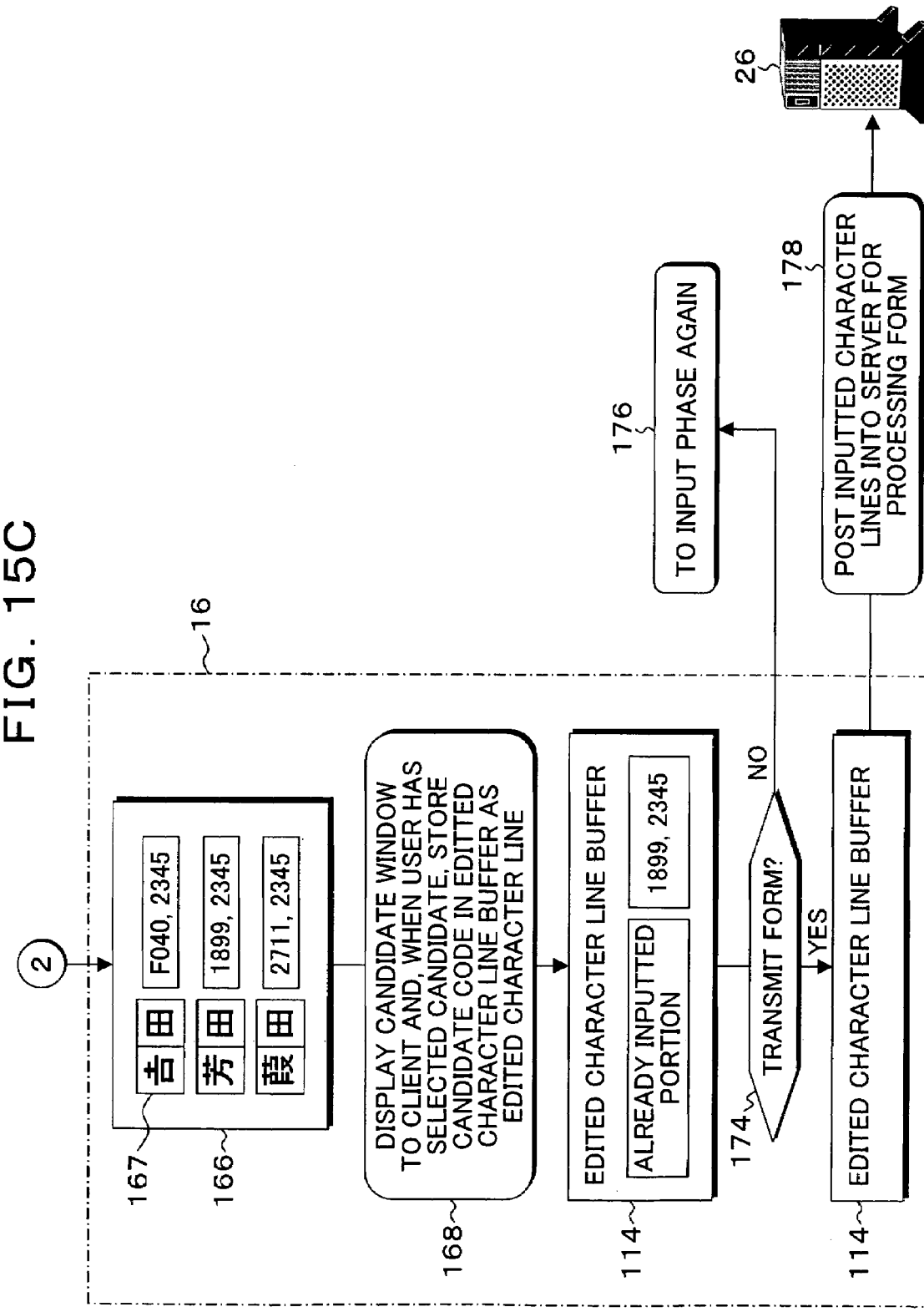

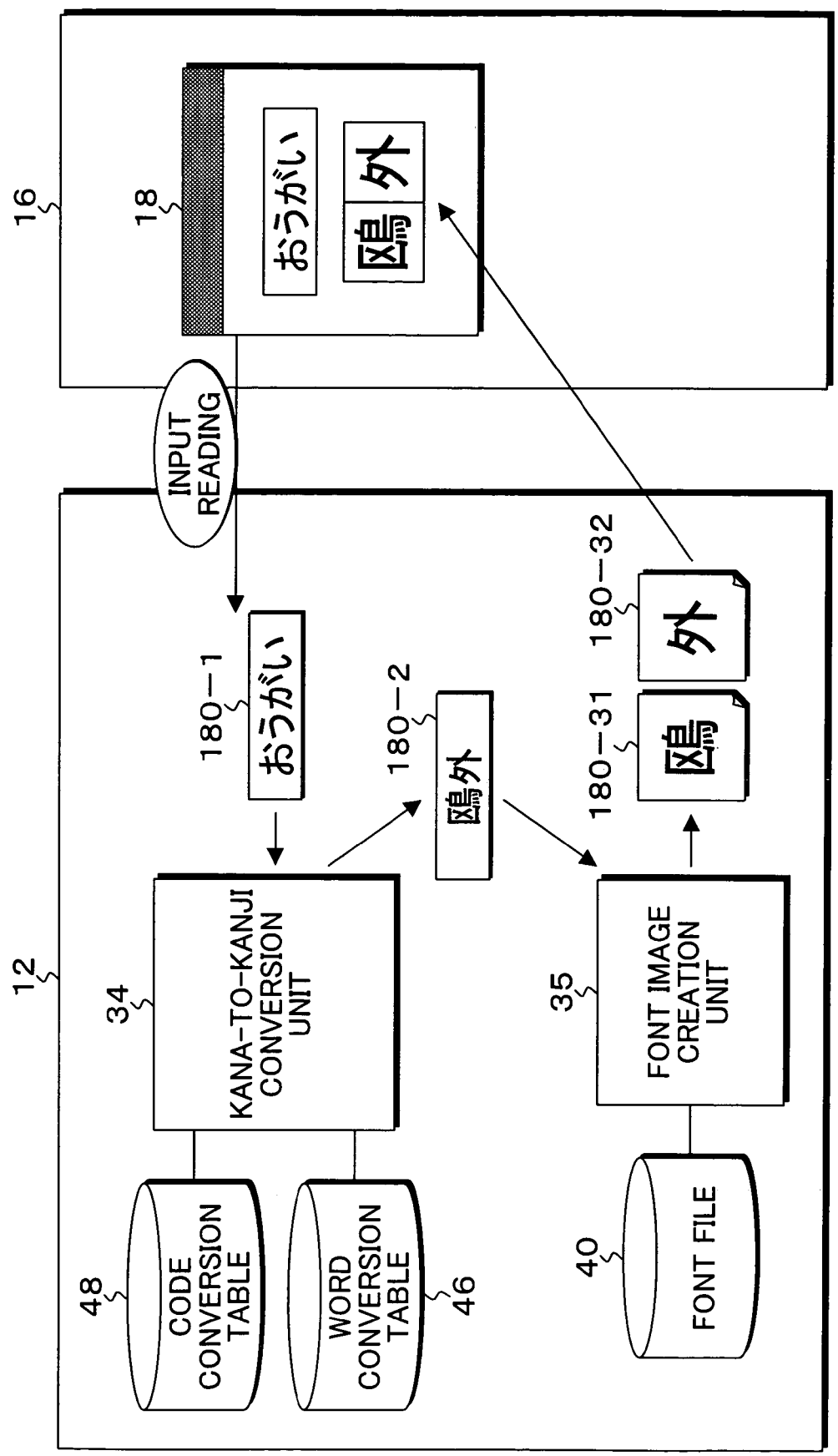

KANA-TO-KANJI CONVERSION METHOD, APPARATUS AND STORAGE MEDIUM

BACKGROUND OF THE INVENTION

1. Field of the Invention

The present invention relates generally to a program, a character inputting and editing method, an apparatus and a storage medium, for inputting and editing characters by a server, in which a web-page is opened for inputting characters by use of a client's browser, and more particularly to a program, a character inputting and editing method, an apparatus and a storage medium, for inputting and editing characters by a server, in which the client's browser is used to execute inputting of characters for applications integrating a plurality of operation systems operated in different character codes.

2. Description of the Related Arts

Conventionally, when characters are inputted by a client into an application provided by a server, characters are inputted according to a character inputting program provided by the OS of a client, for example, the kana-to-kanji conversion program IME® under Japanese-language-supporting WINDOWS®.

In the case where the application employs a different character code system from that of the OS of the client as its operating character code, it is necessary to distribute a character inputting program corresponding to the operating character code with a word dictionary and a font file to the client in advance.

However, in a character inputting and editing system which distributes a character inputting program of its operating character code with a word dictionary and a font file to the client, the work for distributing to the client the character inputting program and the word dictionary using FTP or open files or manually at the constructing stage of the system is necessary. Furthermore, in the case where correction of font data and addition of custom characters are executed during the operation, the data have to be distributed to all clients every time they are executed and, therefore, operation cost becomes higher.

Furthermore, in order to input such characters from the client as custom characters and vendor-dependent characters, it is necessary to use a specific application. Therefore, the initial cost becomes high because setting up of the application has to be executed to all clients when the system is started up.

In the case where English-language-supporting OSs are used as the OS of an client as in foreign countries, since Japanese language can not be inputted, it is impossible to utilize a Japanese-supporting application provided by the server.

Furthermore, in recent years, a need for constructing a integrated operation system capable of handling concurrently a plurality of operation systems due to consolidation of cities, towns and villages. However, it is difficult to integrate when the operation systems that consolidation is intended are respectively indifferent code systems. Therefore, it is necessary to construct newly an operation system having a specific code system, resulting in considerable increase in work amount and cost.

SUMMARY OF THE INVENTION

It is therefore the object of the present invention to provide a program, a character inputting and editing method, an apparatus and a storage medium for a server, having no need to distribute in advance any program and data, and capable of handling concurrent operation systems even in different code systems.

In order to achieve the above object, according to a first aspect of the present invention there is provided a program for character inputting and editing, executed by a computer that constitutes a server in an operation system handling as its operating character code a plurality of different character codes.

The program allows the computer constituting the server to execute:

a kana-to-kanji conversion step for, when receiving, from a client, kana information of an input character string for which an operating character code has been designated, converting the kana information into a kanji character string of an intermediate code and a kanji character string of the operating character code, and thereafter creating a candidate list of a kanji character string consisting of character images of the operating character code and the intermediate code, sending the candidate list together with a candidate selection program to the client, and causing the client to select a character string of a kanji candidate; and an editing/outputting step for receiving an operating character code of the selected kanji character string from the client and transferring the received operating character code to a corresponding operation system.

Thus, according to the invention, by, on the client side using a browser, executing a kana-inputting function transferred as a character inputting program, and processing, on the server side, all functions other than this kana-inputting function, i.e., kana-to-kanji conversion functions including word dictionary conversion function, font images conversion function including custom characters and conversion functions in each code system, it is not necessary to distribute any data to client terminals. Furthermore, no setting up work can be omitted for clients even for initial introduction.

Furthermore, even when the OS on the client side is an English-supporting OS having no Japanese-character inputting functions such as Japanese font, kana-to-kanji dictionary, kana-to-kanji conversion program IME, it is possible to input Japanese language. Furthermore, the work amount and cost accompanying consolidation can be considerably reduced since a integrated operation system capable of handling concurrent operation systems in different code systems of kana-to-kanji conversion is constructed and existing operation systems indifferent code systems can be used without making any change to them.

Furthermore, a method according to the invention comprises a starting up step for sending data for inputting characters and a character inputting program to clients, and a character inputting program thereof starts up with a designated operation for an input area of a web-page for inputting characters and, accompanying the start-up, the character inputting function, for example, the kana-to-kanji conversion program, IME in the case of Japanese-supporting WINDOWS® is terminated.

According to the invention, an intermediate code of kanji characters is a large-scale code containing a plurality of operating character codes and, in a kana-to-kanji conversion step, a large-scale code corresponding to kana-reading information of an input character string is obtained by referring to a kana-to-kanji conversion table in which the large-scale code is registered and, furthermore, an operating character code corresponding to the large-scale code of the kanji character string is obtained by referring to a code conversion table in which a plurality of operating character codes are registered corresponding to the large-scale code.

A kana-to-kanji conversion step receives kana-reading information of the input character string for which the type of the dictionary to be used is designated in addition to designation of an operating character code from the client, and creates a candidate list of kanji consisting of character images of the operating character code and the intermediate code. The designation of the type of dictionary to be used includes names and addresses. The kana-to-kanji conversion step creates a candidate list of kanji character string for which both of the intermediate code and the operating character code, and sends the list to a client.

The kana-to-kanji conversion step comprises a font image creation step in which, when a font image creation request of a character code including designation of font size in addition to kana information of the input character string for which an operating character code is designated from a client is received, after an outline font of the character code requested from a font file is obtained and is made into an image, the image is converted into an image file in a predetermined image format and sent to the client and displayed. As described above, at the time when a character image is needed on a web-page on the client side, a server program automatically creates a character image and return it to the client. Thereby, it is not necessary to distribute the font to the client in advance and even a new font can be cop d with on the server side.

A candidate selecting program sent to the client with a candidate list in the kana-to-kanji conversion step stores the operating character code of a kanji character string selected from the candidate list, in a edited character string buffer, determines transmission operation of a web-page for inputting characters and causes the sever to transmit the kanji character string of the operated character code stored in the edited character string buffer.

The program for inputting characters sent to the client in the starting up step comprises display functions for assisting inputting including display of input area necessary for inputting characters and display of inputting positions. Thereby, inputting operation same as the one in a character inputting program based on the OS of the client can be executed.

In the case of Japanese language, the program for inputting characters sent to the client in the starting up step converts kana into kanji by retrieval using key words including reading, character code, the number of strokes, varied characters, radicals, parts or hand-written strokes.

Furthermore, in the kana-to-kanji conversion step, when the hybrid mode using both font files of server and client has been designated, only the operating character codes in a predetermined range are converted into character images of intermediate codes and the operating character codes out of the range are sent to the client side as they are and converted there into character images. In this manner, by using the font of the client and the font of the server switching dynamically between them, characters can be inputted, displayed and printed securely and quickly without depending on the installation status of the font file at the client.

In order to achieve the above object, according to a second aspect of the present invention there is provided a character inputting and editing method for a server in an operation system handling as its operating character code a plurality of different character codes. The character inputting and editing method comprises:

a kana-to-kanji conversion step effected by a kana-to-kanji conversion unit, which step includes, when receiving, from a client, kana information of an input character string for which an operating character code has been designated, converting the kana information into a kanji character string of an intermediate code and a kanji character string of the operating character code, and thereafter creating a candidate list of a kanji character string consisting of character images of the operating character code and the intermediate code, sending the candidate list together with a candidate selection program to the client, and causing the client to select a character string of a kanji candidate; and an editing/outputting step effected by an editing/outputting unit, which step includes receiving an operating character code of the selected kanji character string from the client, and transferring the received operating character code to a corresponding operation system.

In order to achieve the above object, according to a third aspect of the present invention there is provided a server apparatus in an operation system handling as its operating character code a plurality of different character codes. The server apparatus comprises:

a kana-to-kanji conversion unit for, when receiving, from a client, kana information of an input character string for which an operating character code has been designated, converting the kana information into a kanji character string of an intermediate code and a kanji character string of the operating character code, and thereafter creating a candidate list of a kanji character string consisting of character images of the operating character code and the intermediate code, sending the candidate list together with a candidate selection program to the client, and causing the client to select a character string of a kanji candidate; and an editing/outputting unit for receiving an operating character code of the selected kanji character string from the client and transferring the received operating character code to a corresponding operation system.

In order to achieve the above object, according to a fourth aspect of the present invention there is provided a computer-readable record medium having thereon stored a program to be executed by a computer that constitutes a server in an operation system handling as its operating character code a plurality of different character codes.

The storage medium stores thereon the program which allows the computer to execute:

a kana-to-kanji conversion step for, when receiving, from a client, kana information of an input character string for which an operating character code has been designated, converting the kana information into a kanji character string of an intermediate code and a kanji character string of the operating character code, and thereafter creating a candidate list of a kanji character string consisting of character images of the operating character code and the intermediate code, sending the candidate list together with a candidate selection program to the client, and causing the client to select a character string of a kanji candidate; and an editing/outputting step for receiving an operating character code of the selected kanji character string from the client and transferring the received operating character code to a corresponding operation system.

The detail of the method for supporting Japanese, an apparatus and a storage medium according to the invention is basically same as those of the program for inputting and editing of characters.

The invention further provides a program, a method for inputting and editing characters, an apparatus and a storage medium for inputting and editing characters by server, supporting a language other than Japanese in which key-inputted characters are converted into other characters. As such language, a language needing to convert into kanji, for example, Chinese and Korean is targeted.

In order to achieve the above object, according to a fifth aspect of the present invention there is provided a program for character inputting and editing without being limited to handling Japanese only, the program allowing a computer that constitutes a server in an operation system handling as its operating character code a plurality of different character codes, to execute:

a character conversion step for, when receiving from a client a pre-conversion input character string for which an operating character code has been designated, converting the pre-conversion character string into a post-conversion character string of an intermediate code and a post-conversion character string of the operating character code, and thereafter creating a candidate list of the post-conversion character string consisting of character images of the operating character code and the intermediate code, sending the candidate list together with a candidate selection program to the client, and causing the client to select a post-conversion character string; and an editing/outputting step for receiving a selected post-conversion character string from the client, and transferring the received character string to a corresponding operation system.

In order to achieve the above object, according to a sixth aspect of the present invention there is provided a character inputting and editing method without being limited to handling Japanese only for a server in an operation system handling as its operating character code a plurality of different character codes, the method comprising:

a character conversion step effected by a character conversion unit, which step includes, when receiving from a client a pre-conversion input character string for which an operating character code has been designated, converting the pre-conversion character string into a post-conversion character string of an intermediate code and a post-conversion character string of the operating character code, and thereafter creating a candidate list of the post-conversion character string consisting of character images of the operating character code and the intermediate code, sending the candidate list together with a candidate selection program to the client, and causing the client to select a post-conversion character string; and an editing/outputting step effected by an editing/outputting unit, which step includes receiving a selected post-conversion character string from the client, and transferring the received character string to a corresponding operation system.

In order to achieve the above object, according to a seventh aspect of the present invention there is provided a server apparatus without being limited to handling Japanese only. The server apparatus in an operation system handling as its operating character code a plurality of different character codes, comprises:

a character conversion unit for, when receiving from a client a pre-conversion input character string for which an operating character code has been designated, converting the pre-conversion character string into a post-conversion character string of an intermediate code and a post-conversion character string of the operating character code, and thereafter creating a candidate list of the post-conversion character string consisting of character images of the operating character code and the intermediate code, sending the candidate list together with a candidate selection program to the client, and causing the client to select a post-conversion character string; and an editing/outputting unit for receiving a selected post-conversion character string from the client, and transferring the received character string to a corresponding operation system.

In order to achieve the above object, according to an eighth aspect of the present invention there is provided a storage medium capable of being read by a computer storing a program supporting languages other than Japanese to be executed by a computer constructing a server of an operation system handling a plurality of different character codes as operating character codes. The record medium stores thereon the program which allows the computer to execute:

a character conversion step for, when receiving from a client a pre-conversion input character string for which an operating character code has been designated, converting the pre-conversion character string into a post-conversion character string of an intermediate code and a post-conversion character string of the operating character code, and thereafter creating a candidate list of the post-conversion character string consisting of character images of the operating character code and the intermediate code, sending the candidate list together with a candidate selection program to the client, and causing the client to select a post-conversion character string; and an editing/outputting step for receiving a selected post-conversion character string from the client, and transferring the received character string to a corresponding operation system.

The detail of a method for inputting and editing characters by a server supporting languages other than Japanese according to the invention is basically the same as those of a method for inputting and editing characters by a server supporting Japanese.

As described above, according to the invention, a character inputting program is transferred concurrently with a web-page for inputting characters by opening a web-page of the server using a browser on the server side. Thereby, kana inputting function can be realized. As to the functions other than this kana inputting function, i.e., kana-to-kanji conversion function including the word dictionary conversion function, font image conversion function including custom characters and code system conversion function are all processed on the server side and, therefore, it is completely not necessary to distribute data such as a character input/output program, dictionary, font file to the client in advance and, therefore, the setting up work for the client for initial introduction is completely not necessary.

Furthermore, even when the OS on the client side is an OS supporting English without any function for inputting Japanese characters, inputting Japanese can be realized for a client having an OS supporting any languages by making an access to a web-page of a server of the invention by solely the browser of the client.

Furthermore, according to the invention, since an operating character code can be designated as an attribute of an input area of the web-page for inputting characters, a integrated operation system for inputting characters covering concurrent operation systems respectively in different code systems can be constructed. For example, by applying the invention to, as a target, for example, operation systems each having a different code system of a plurality of self-governing bodies, a integrated operation system capable of handling concurrent operation systems of self-governing bodies using different code systems can be constructed and, therefore, the existing operation systems in respectively different code systems can be used as they are. Therefore, the work and cost accompanying the consolidation can be considerably reduced.

Furthermore, according to the invention, by designating hybrid processing that uses the font files of both the server and the client, the standard character codes having high possibility that its font file is managed by the client are converted by the client into character images after sending them from the server, and only the custom characters not supported by the client are converted into character images by the server and their character code are distributed to clients. Thereby, custom characters can be used without installing custom character font into clients in advance.

Furthermore, by managing on the server side a character code set normally managed on the client side, image data distribution target data, it is possible to facilitate reduction of the load for data management and distribution on the client side.

BRIEF DESCRIPTION OF THE DRAWINGS

The above and other objects, aspects, features and advantages of the present invention will become more apparent from the following detailed description when taken in conjunction with the accompanying drawings, in which:

FIG. 1 is a block diagram of the system environment that the invention is applicable to;

FIG. 3 illustrates a word dictionary provided on the server shown in FIG. 1;

FIG. 5 illustrates an application web-page opened by a browser of the client;

FIGS. 6A and 6B illustrate attribute information set on an application web-page;

FIGS. 7A and 7B illustrate the selection of input areas and candidate windows on the application web-page;

FIG. 9 is a block diagram of the functional configuration of a kana-to-kanji conversion UI engine sent from the server to the client;

FIGS. 13A and 13B illustrate a kana-to-kanji conversion process at the server;

FIGS. 15A to 15C illustrate a candidate creation process during hybrid-on at the server;

FIG. 18 illustrates a font image creation process of the invention together with a kana-to-kanji conversion process;

DESCRIPTION OF THE PREFERRED EMBODIMENTS

Figure 1:
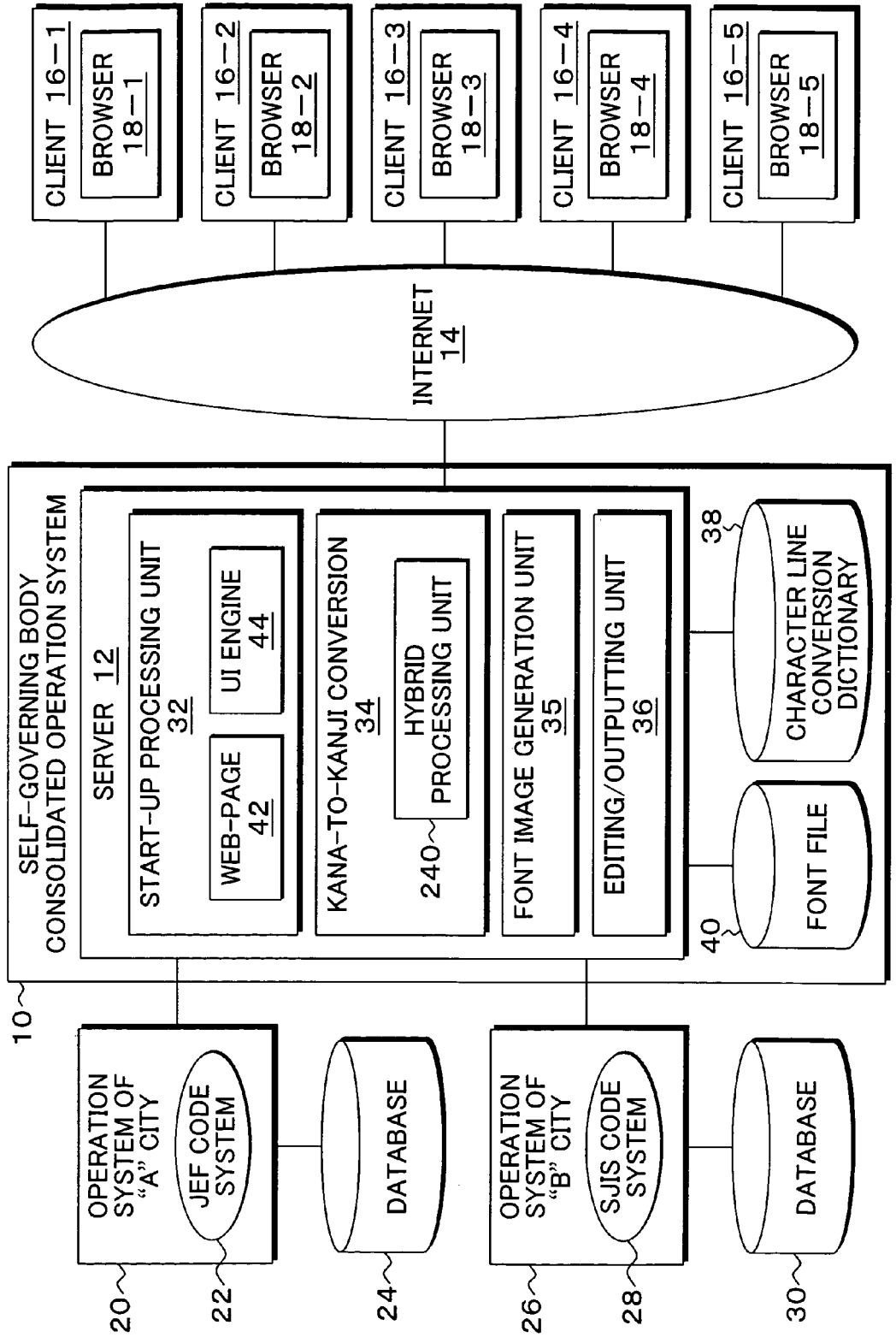

FIG. 1 is a block diagram of the system environment that character inputting processing by a server supporting Japanese according to the invention is applicable to, and takes an example of a integrated operation system covering operation systems of a plurality of self-governing bodies, using kana-to-kanji conversion each in different code systems.

In FIG. 1, an operation system 20 of "A" City and an operation system 26 of "B" City, each comprising each of databases 24 and 30 respectively, are connected with a self-governing body integrated operation system 10. Here, the operation system 20 of "A" City employs a JEF code system 22 while the operation system 26 of "B" City employs a SJIS code system 28. The self-governing body integrated operation system 10 covers concurrent operation for the operation system 20 of "A" City and the operation system 26 of "B" City respectively employing a different code system.

The self-governing body integrated operation system 10 is provided with a server 12 according to the invention. Clients 16-1 to 16-5 of users are connected with the server 12 through the Internet 14. Each of the clients 16-1 to 16-5 is provided respectively with a browser 18-1 to 18-5 for making accesses to a web-page of an application provided by the server 12.

The server 12 provided with a start-up processing unit 32, a kana-to-kanji conversion unit (character conversion unit) 34, a font image creation unit 35 and an editing/outputting unit 36, and is further provide externally with a character string conversion dictionary 38 and a font file 40. Furthermore, in the kana-to-kanji conversion unit 34, a hybrid processing unit 240 for using a client font and a server font switching dynamically between them is provided and the processing function of the hybrid processing unit 240 is turned on or off as necessary.

The start-up processing unit 32 is provided with a web-page 42 and a user interface engine (hereinafter, referred to as "UI engine") 44. When the start-up processing unit 32 has received an access for opening the web-page 42 from either of the clients 16-1 to 16-5, the unit 32 transmits the web-page 42 for inputting characters of an application handling concurrently the operation system 20 of "A" City and the operation system 26 of "B" City each employing respectively a different character code, and a character inputting program shown as the UI engine 44 to the client side.

Here, the UI engine 44 of the start-up processing unit 32 has an UI engine for kana conversion being a character inputting program for starting up and an UI engine for selecting candidates being a candidate selection program disclosed in the following description, and, When a web-page is opened by a browser of a client, the UI engine 44 sends to the client the character inputting program being the UI engine for kana conversion.

This transferring of the web-page 42 and the UI engine 44 from the start-up processing unit 32 when the web-page is opened by the browser of the client is, more specifically, to send a Java® script as the kana conversion UI engine 44 and to send text-format data by a style sheet or a CSV as the web-page.

The kana-to-kanji conversion unit 34 is provided with following two (2) functions:
(1) kana-to-kanji conversion function and
(2) candidate-list creation function.

The kana-to-kanji conversion function in the kana-to-kanji conversion unit 34 creates a conversion list in which kana reading information is converted into kanji character string of an intermediate code and kanji character string of an operating character code when the kana reading information of an input character string for which an operating character code is designated is received from the client. That is, the function obtains a kanji character string of the intermediate code and the operating character code corresponding to the kana reading information of the input character string by referring to the character string conversion dictionary 38.

The candidate-list creation function of the kana-to-kanji conversion unit 34, based on the conversion list, creates a candidate list storing one (1) or more candidates of a kanji character string consisting of character images of the operating code and the intermediate code. That is, the function creates the candidate list by obtaining the kanji character images in a bit-map format such as PNG, by the intermediate code stored in the font file 40.

Furthermore, the kana-to-kanji conversion unit 34 sends the candidate list with a UI engine (Java® script) for selecting candidates being a candidate selection program to the client and causes the client to display it to select.

When the hybrid mode using the font files of both of the server and the client is turned on, the hybrid processing unit 240 provided to the kana-to-kanji conversion unit 34 converts only the operating character code within a predetermined range into character images of the intermediate code sends it to the client side, and sends the operating character code out of the range as it is to the client side and causes the client to display it. By using the font of the client and the font of the server switching dynamically between them in this manner, characters can be inputted, displayed and printed securely and quickly without depending on the installation status of the font file at the client.

The following information is set to the hybrid processing unit 240 by, for example, a system manager etc. for each of the clients 16-1 to 16-5.
(1) being on or off of the hybrid mode,
(2) image data distribution range of the operating character code for which the server 10 distributes the character images and
(3) font such as MS-Mincho for displaying characters at the client.

Based on this setting, when the hybrid mode is on, the hybrid processing unit 240 converts only the operating character code within the range having been set among the input character strings requested from the client into character images of the intermediate code and send them to the client, and sends the operating character codes out of the range to the client side as they are, and causes the client to convert them into character images using the font that the client has.

When the font image creation unit 35 has received from the client a font image creation request of a character code containing designation of a font size in addition to kana information of a input character string for which an operating character code is designated, after obtaining an outline font of the character code requested from the font file 40 and converting it into an image, the unit 35 converts it into an image file in, for example, PNG format and transmits it to the client to cause the client to display it.

In the case where the hybrid processing unit 240 is operating by turning on the hybrid mode, the font image creation unit 35 transmits character code data itself but not the image data, as to the operating character code out of the image data distribution range. For example, the unit 240 obtains from the character string conversion dictionary kana character input from the client and creates character code data of it using encoded Unicode. Then, after decorating this character code data such that it is displayed in the font designated when the conversion is requested from the client, the decorated data is sent to the client and is converted into character images using the font that the client has and is displayed.

The editing/outputting unit 36 receives a kanji character string of the operating character code to be an HTML document object sent by transmission operation executed when inputting characters to the web-page for inputting characters on the client side is finished and, in the case where the operating character code of the received document object is JEF code, the unit 36 transfers the character string of the operating character code to the operation system 20 of "A" City while, in the case where the operating code is SJIS code, the unit 36 transfers the character string of the received operating character code to the operation system 26 of "B" City.

Figure 2:
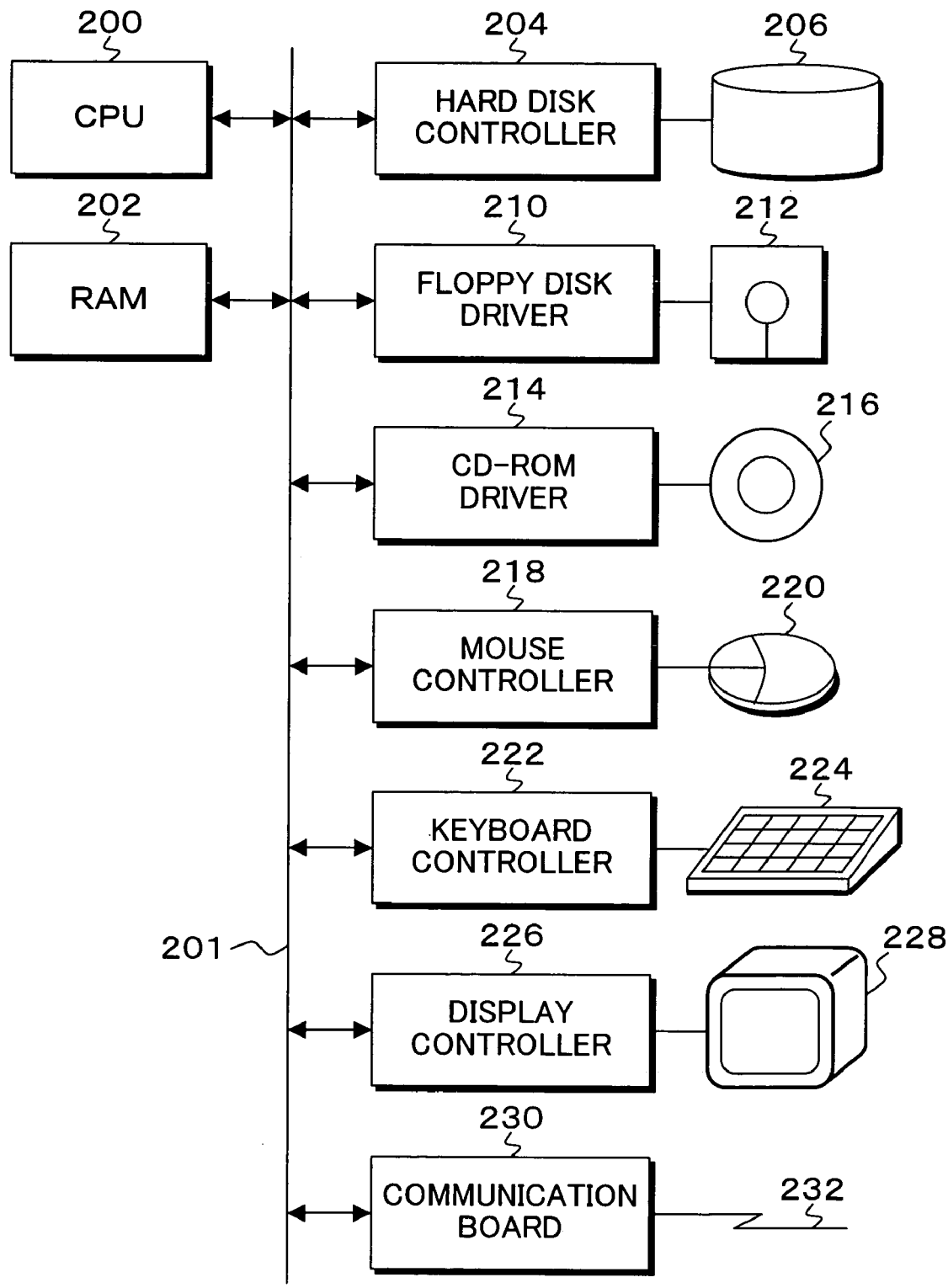
FIG. 2 is a block diagram of the hardware resource of a computer used as a server or a client shown in FIG. 1.

The server 12 of the invention shown in FIG. 1 is realized by, for example, hardware resource of a computer shown in FIG. 2. In the computer shown in FIG. 2, a bus 201 of a CPU 200 is connected with an RAM 202, a hard disk controller (software) 204, a floppy disk driver (software) 210, a CD-ROM driver (software) 214, a mouse controller 218, a keyboard controller 222, a display controller 226 and a communication board 230.

The hard disk controller 204 is connected with the hard disk drive 206, is loaded with an application program for executing a character inputting/editing process of the invention, calls a necessary program from the hard disk drive 206 when starting up a computer, deploys it on the RAM 202 and causes the CPU 200 to execute it.

The floppy disk driver 210 is connected with a floppy disk drive (hardware) 212 and can read from/write into a floppy disk® The CD-ROM driver 214 is connected with a CD drive (hardware) 216 and can read out data or programs stored in a CD.

The mouse controller 218 transmits input operation of a mouse 220 to the CPU 200. The keyboard controller 222 transmits input operation of a keyboard 224 to the CPU 200. The display controller 226 execute display operation to a display unit 228. The communication board 230 uses a communication line 232 including radio communication and communicate with other computers and servers through a network such as the Internet. The clients 16-1 to 16-5 shown in FIG. 1 are also realized by the same hardware resource of computers.

Furthermore, a storage medium in which the application program executing a character inputting/editing process of the invention is recorded includes a database retaining programs through a line or another computer system PC as well as its databases in addition to portable storage media such as a CD-ROM, a floppy disk (FD), a DVD disk, a magneto-optical disk and an IC card and storage apparatuses such as a hard disk (HDD) equipped internally and externally to a computer, and further includes transmitting media on a line.

FIG. 3 illustrates the character string conversion dictionary 38 provided to the server 12 shown in FIG. 1. The character string conversion dictionary 38 is provided with a kana-to-kanji conversion table 46 and a code conversion table 48. The kana-to-kanji conversion table 46 stores items of reading 50, type 52, inscription 54 and an intermediate code 56. The reading 50 and the type 52 are identified by kana reading information of an input character string received from the client side and a dictionary type designated by the attribute of an input area on the client side.

The intermediate code 56 has a code system supporting all character types such as JEF code system of the operation system 20 of "A" City and SJIS code system of the operation system 26 of "B" City shown in FIG. 1 and, furthermore, other different code systems to be integrated, and constructs a so-called large-scale code.

This kana-to-kanji conversion table 46 retrieves the intermediate code 56 of a kanji character string for which reference by the kana reading of an input character string received from the client side and dictionary type results matched.

The code conversion table 48 covers JEF code system, SJIS code system and, in addition, various code systems currently used and registers, for example, SJIS code 60, JEF code 62 and other 64 codes to support for the intermediate code 56 and a character 58.

Thus, by referring to the code conversion table 48 using the intermediate code of the kanji character string obtained from the reading information inputted at the kana-to-kanji conversion table 46, a kanji character string code of an operating character code designated from the client using input information can be obtained.

Figure 4:
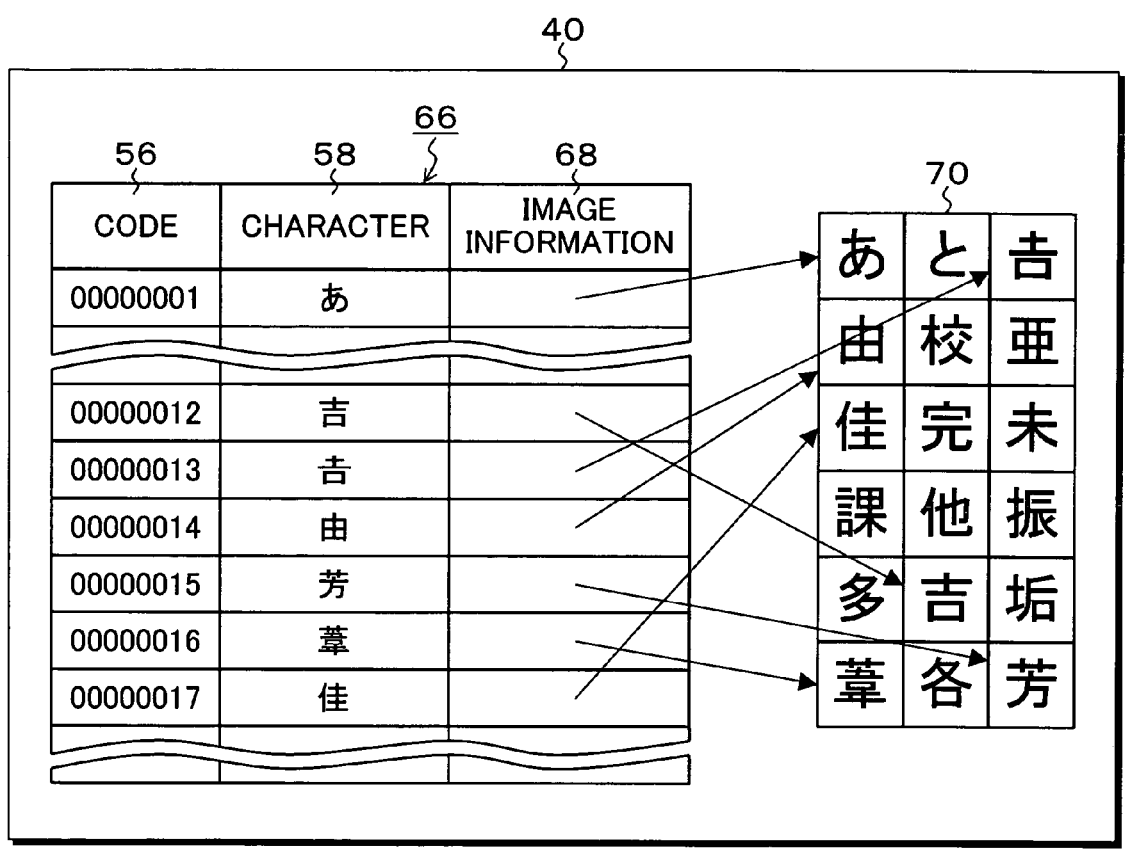
FIG. 4 illustrates a font file provided on the server shown in FIG. 1.

FIG. 4 illustrates the font file 40 provided to the server 12 shown in FIG. 1. The font file 40 is provided with an intermediate font file 66 and an intermediate font image file 70. The intermediate font file 66 consists of the intermediate code 56, the character 58 and an image information 68, and the image information 68 is linked with the intermediate font image file 70 as indicated by the arrow.

The intermediate font image file 70 stores, for example, character images of PNG format. This font file 40 is used for creating a candidate list comprising the intermediate code of a kanji character string obtained from the kana reading information of the character input from the client side and its character image.

FIG. 5 illustrates an application web-page in HTML form of the server 12 opened by, for example, the browser 18-1 of the client 16-1 shown in FIG. 1. in FIG. 5, the application web-page 72 is an "application for XXX" to, for example, the operation system 20 of "A" City, having input areas 74, 76 and 78 for items of name, address and the objective of use and, furthermore, is provided with a "Transmit" button 80 and a "Cancel" button 82. Attribute information can be set in advance in each of the input areas 74, 76 and 78 in the application web-page 72.

For an application web-page of character-input type, the following web plug-in modules are also available in addition to HTML form.
ActiveX control
ASP (Active Server Page)
Java® applet
PDF form etc.

Figure 6A:

FIG. 6 illustrates the attribute information set in the input areas. In FIG. 6, attribute information 84 set in the input area 76 for address in the application web-page 72 is taken and its attribute and the description of it are shown.

As the attributes capable of being set in the input area 76, the following items can be set and each of them has its contents described in the description 84 on the right of It.
(1) an editable flag,
(2) the name of an item,
(3) a tub index,
(4) display text,
(5) dictionary type,
(6) input font size,
(7) list font size,
(8) settings of the longest character length,
(9) grid displayed, and
(10) character code.

Among the above items, as the information necessary for sending to the server 12 the reading information of the character string inputted by the client and applying it with kana-to-kanji conversion, "dictionary type" and "character code" are important.

For the attribute information in the input area, the following items can be set.
(a) the attribute of position-dominant character on a network of the dictionary used size (height, width), color, shape (italic, emphasized etc.), (superscript, subscript etc.), font face (mincho, gothic etc.)
(b) the attribute of a character of candidate kanji size (height, width), color, shape (italic, emphasized etc.), (superscript, subscript etc.), font face (mincho, gothic etc.)
(c) the attribute of a character of selected kanji size (height, width), color, shape (italic, emphasized etc.), (superscript, subscript etc.), font face (mincho, gothic etc.)
(d) the attribute of a input form shape size, color, image to be displayed on the background etc.
(e) the attribute of operation of input form the number of characters that can be inputted, limiting designation of characters that can be inputted (for example, hiragana only) etc.
(f) the attribute of the selection window shape size, color, image displayed on the background etc.

FIGS. 7A and 7B illustrate a character input process to an application web-page opened by the client. FIG. 7A illustrates a process for inputting characters into the input area 74 for a name in the application web-page. When the application web-page is opened by the browser of the client, as shown in FIG. 1, the web-page and, concurrently, a Java® script functioning as a kana conversion UI engine being a character input program are sent from the start-up processing unit 32 of the server 12 a character processing process shown in FIGS. 7A and 7B can be executed by a programmed process of this kana conversion UI engine.

In the application web-page 72 shown in FIG. 7A, when the "enter key" of the keyboard of the client is pushed down, flashing in a designated color shown in gray in the top input area 74 is executed and a caret 88 indicating the character input position is processed. During focusing on this input area 74, the Japanese IME of, for example, WINDOWS® provided by the OS of the client is stopped. Therefore, the character input after focusing on the input area 74 is processed by execution of the program of the kana conversion UI engine transmitted from the server 12.

The caret 88 of the focused input area 74 indicated by the kana conversion UI engine is a display by animation GIF using an image in PNG format. The caret 88 can be moved to the position of a cursor 86 when a click is made on the position of the cursor 86 with the mouse.

Then, as shown in FIG. 7B, when "よしだ" is inputted through key-operation by the client, the inputted characters, "よしだ" is displayed in a kana input window 90. Here, the character input of Japanese at the keyboard of the client may use either of romanized writing input or kana input.

When "conversion key" of the keyboard is pushed down for kanji conversion in a state where input into the kana input window 90 has been finished, the reading information of the input character string "よしだ", and "dictionary type" and "operating character code" in the attribute information set in the input area 74 are transmitted to the server shown in FIG. 1. Then, a candidate list of a kanji character string created by the kana-to-kanji conversion unit 34 of the server 12 is sent back and, concurrently with the candidate list, candidate selection UI engine (Java® script) being a candidate selection program is sent back. Then, "吉田・芳田・葦田" is displayed in a candidate window 92 as the candidate list of the kanji character string received from the server 12.

For the candidate list displayed in the candidate window 92, any one (1) of the candidates is selected by moving a focus 94 and, when "enter key" of the keyboard is pushed down using candidate selection information by the focus 94, a candidate is determined. Then, the kanji character string of the selected candidate is inserted and displayed in the kana input window 90 of the input area 74 and the candidate window 92 disappears.

Internally, the intermediate code of the kanji character string selected from the candidate list is stored in the edited character string buffer as a character string of an HTML document object. After inputting of all the necessary characters in the application web-page 72 has been finished, by pushing down the "transmit" button 80, an HTML document object consisting of an arrangement of the intermediate code of the inputted character string including converted kanji stored in the character string editing buffer is read out and sent to the editing/outputting unit 36 of the server 12. Then, the code system of the operation system of the transfer destination is identified from the operating character code and a character string of the operating character code is transferred to the operation system of a corresponding code system.

When the character string inputted by the client may be a kana character string having no need to be kanji-converted, even without pushing down "conversion key", by pushing down "enter key", the kana character code of the inputted kana character is stored in the character string editing buffer as it is.

Figure 8A:
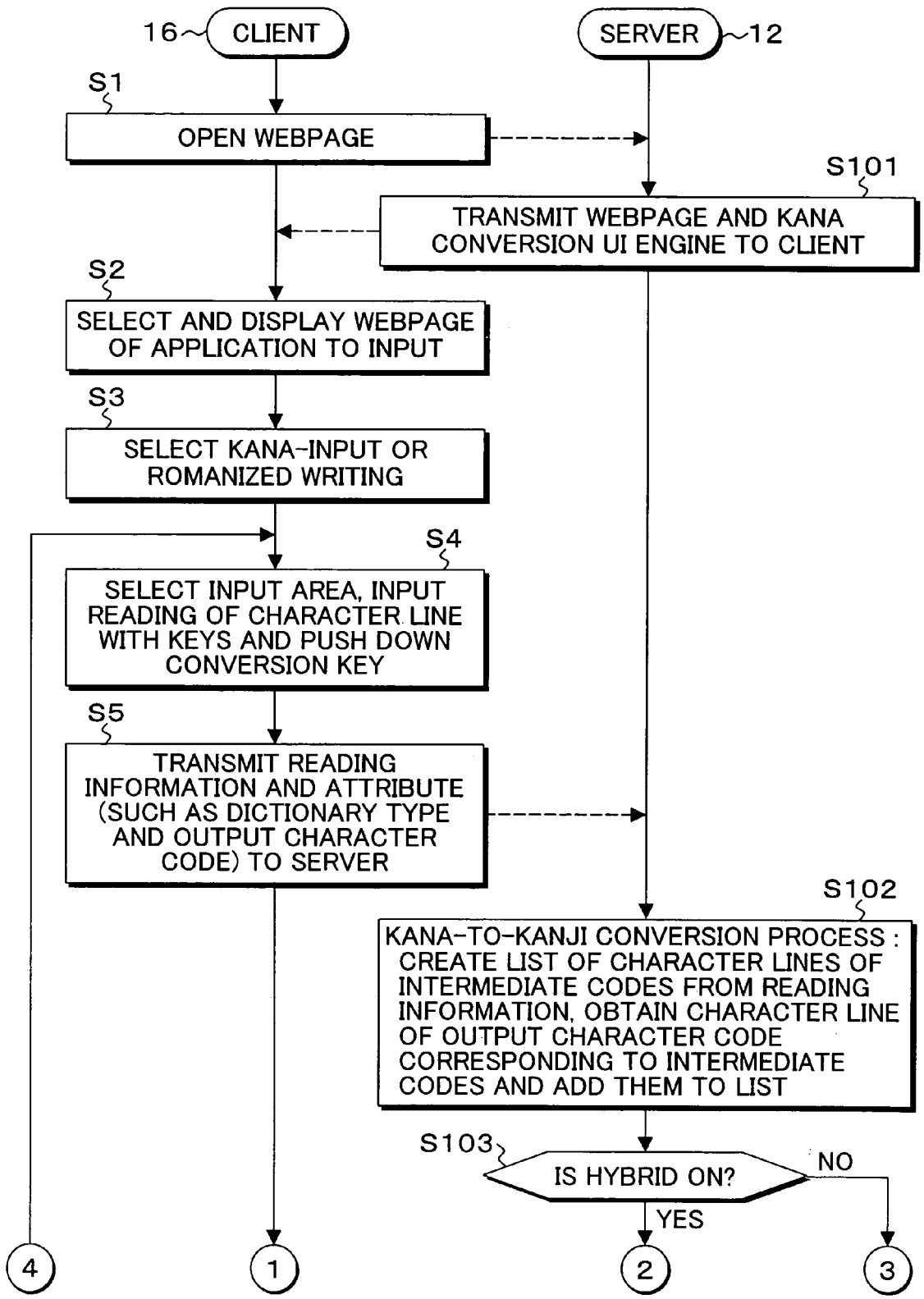
FIGS. 8A to 8C are time-charts of a character input process according to the invention at the client and the server.
Figure 8B:
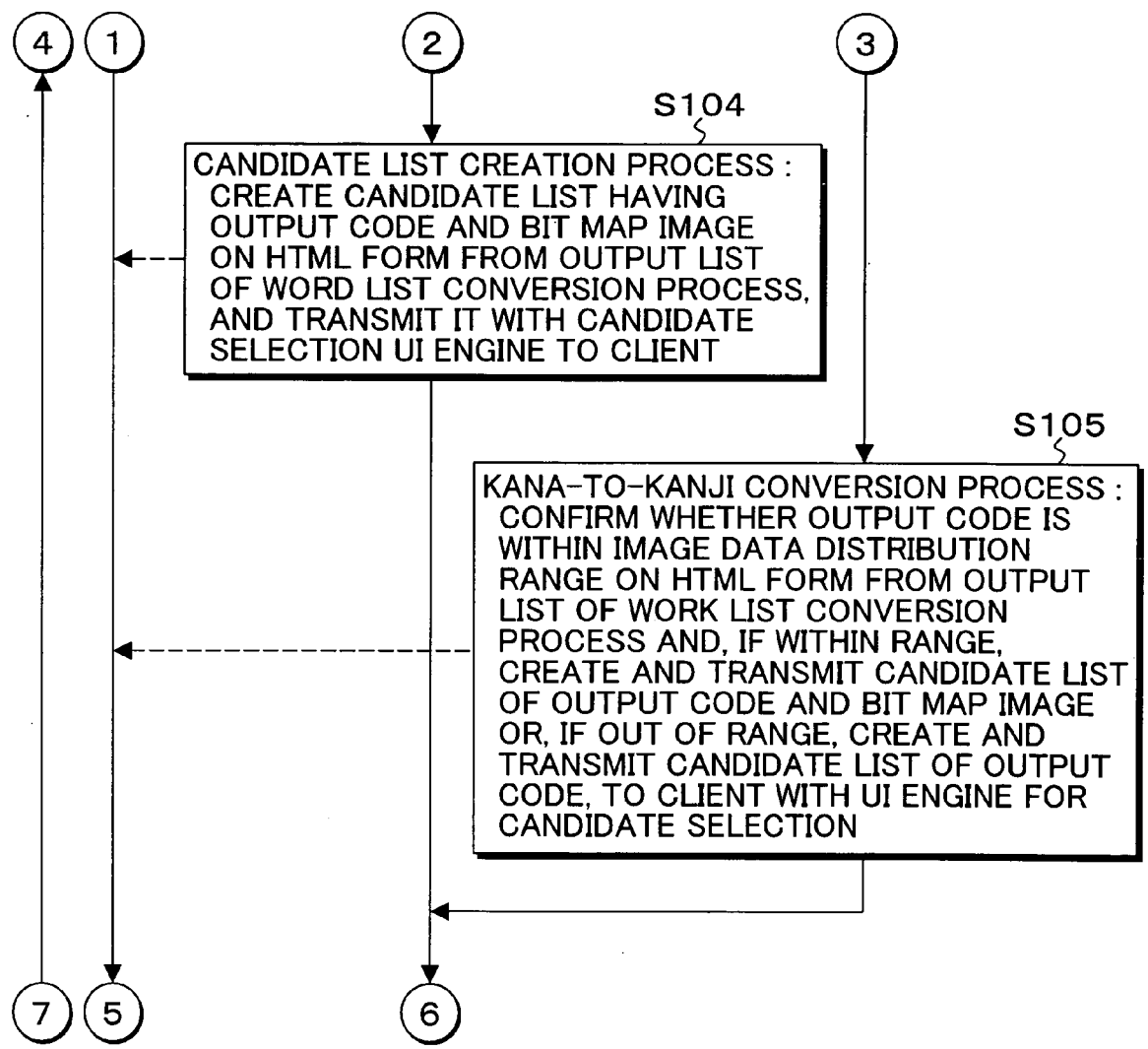
Figure 8C:
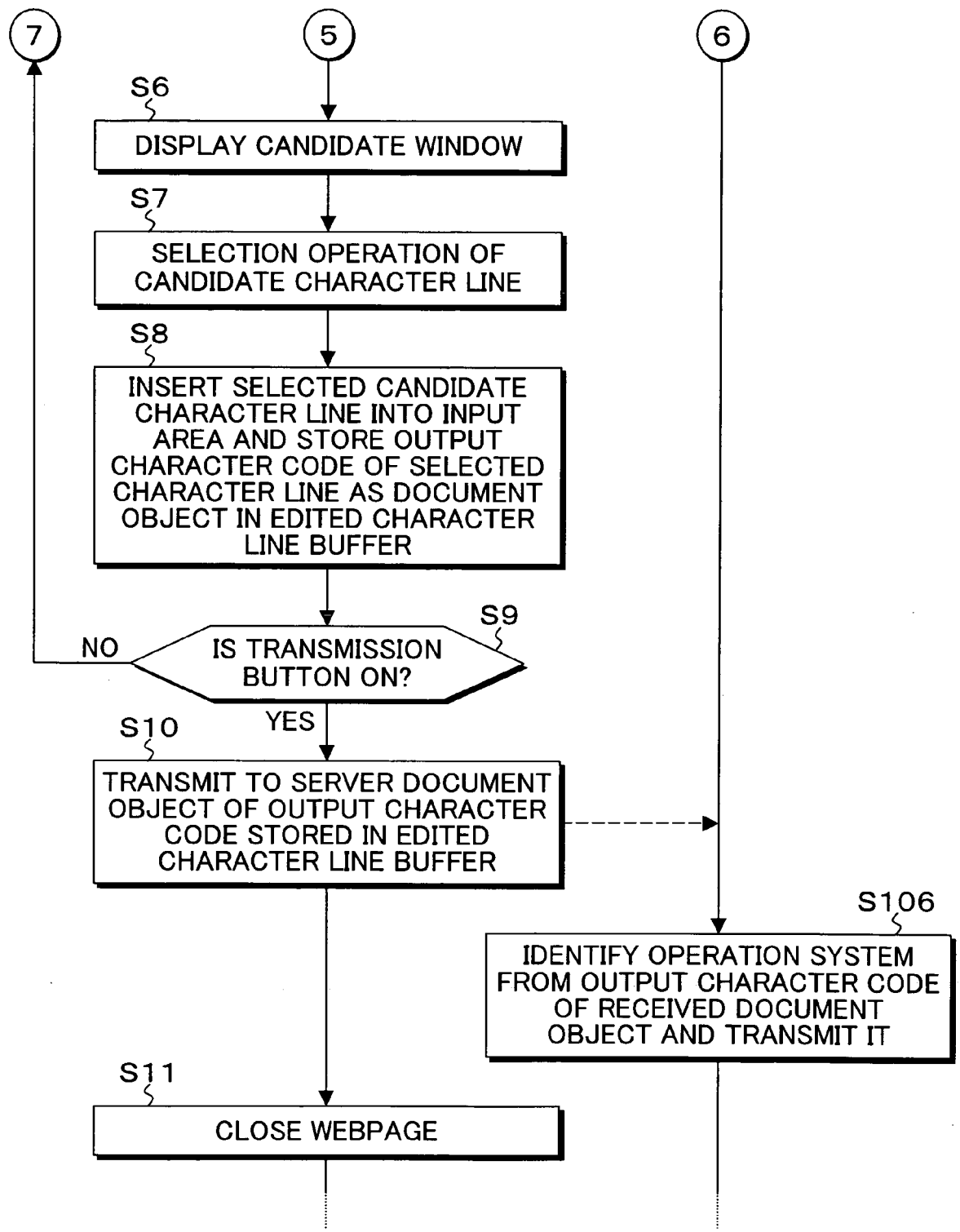

FIGS. 8A to 8C are time charts showing the transactions of the character inputting process according to the invention at the server and the client shown in FIG. 1. In FIGS. 8A to 8C, when a web-page is opened by the client 16 in Step S1, the server 12 transmits the web-page and a kana conversion UI engine to the client 16 in Step S101.

The client 16 selects and displays the web-page of an application for inputting among the received web-pages in Step S2, and selects kana inputting or romanized-writing inputting as the mode of character inputting in Step S3. Then, as shown in FIG. 7A, the client 16 selects the input area of the application web-page and key-inputs the reading of the character string and pushes down "conversion key" in Step S4. Thereby, the client 16 transmit reading information of the inputted character string and attribute information containing dictionary type and the operating character code to the server 12 in Step S5.

The server 12 receives the inputted information from the client 12 and executes word list ? process (kana-to-kanji conversion process) in Step S102. In this kana-to-kanji conversion process, a conversion list of the kanji character string of the intermediate code is created from the reading information by referring to the character string conversion dictionary 38 and, further, obtains a character string of the operating character code corresponding to the kanji character string of the intermediate code and adds it to the conversion list.

Then, in Step S103, being on of the hybrid mode is checked and, when it is off, in Step S104, a candidate list creation process is executed. In this candidate list creation process, in Step S102, the character images of the operating character code and the intermediate code are obtained from the intermediate code of the kanji character string of the conversion list obtained in the kana-to-kanji conversion process and a candidate list is created on an HTML form and the list is transmitted to the client with the candidate selection UI engine.

On the other hand, when being on of the hybrid mode is determined in Step S103, in Step S104, a candidate list creation process according to a hybrid process using the font files of both of the server and the client is executed. In this candidate list creation process, in Step S102, character images of the operating character code and the intermediate code are obtained from the intermediate code of the kanji character string in the conversion list obtained in the kana-to-kanji conversion process are obtained and whether the operating character code is within or out of the image data distribution range set in advance for the operating character code on the HTML form is confirmed and, if within the range, a candidate list containing an operating character code and a bit-map image is created and, if out of the range, a candidate list containing only the operating character code is created without creating any bit-map image and the candidate list is transmitted to the client with the candidate selection UI engine.

The client 16 having received the candidate list from the server 12, in Step S6, as shown in FIG. 7B, displays the candidate list in the candidate window. In this case, when no bit-map image but only the operating character code is in the candidate list, it is converted into a bit-map image using the font file of the client and is displayed.

Then, in Step S7 in FIG. 8C, when selection operation of a kanji character string from the candidate list is executed by the client, the kanji character string selected in the Step S8 is inserted and displayed in the input area of the application web-page. Thereafter, the operating character code of the kanji character string selected as a document object is stored in the edited character string buffer.

Then, in Step S9, checking whether the "transmit" button is on executed when inputting of all characters has been finished is executed and, if being on of the "transmit" button is determined in the Step S9, in Step 10, the document object of the operating character code stored in the edited character string is transmitted to the server. Thereafter, in Step S11, the web-page is closed.

In Step 106, the server 12 identifies an operation system from the operating character code of the document object received from the client and transmits a character string by the operating character code of the document object to the identified operation system.

FIG. 9 is a block diagram of the functional configuration of a kana conversion UI engine sent from the server 12 to the client when a web-page is opened and, more specifically, it is realized by executing a Java® script.

In FIG. 9, a kana conversion UI engine 44-1 is provided to a key inputting unit 96 for inputting key information from the keyboard of the client and comprises a selector 98, a romanized writing conversion table 100, a kana conversion table 102, an input buffer 104, a display processing unit 106 and a transferring unit 108.

When romanized-writing inputting is select d, a key code from the key inputting unit 96 is inputted in the romanized-writing conversion table 100 from the selector 98. On the other hand, when kana inputting is selected, the key code from the key inputting unit 96 is inputted into the kana conversion table 102.

The romanized-writing conversion table 100 converts romanized writing input of kana inputted by English keys into kana characters. The kana conversion table 102 converts into kana characters in response to key input corresponding to the kana inscription of keys. The kana character code outputted by the romanized writing conversion table 100 and the kana conversion table 102 is, for example, SJIS code.

The kana character string converted and outputted by the romanized conversion table 100 or the kana conversion table 102 is stored in the input buffer 104 and is displayed in, for example, the kana input window 90 in FIG. 7B as it is by the display processing unit 106. When operation information of a conversion key is obtained from the key inputting unit 96, the kana character string stored in the input buffer 104 is transferred to the server 12 by the transferring unit 108. When the kana conversion UI engine 44-1 is started up, the Japanese IME provided by the OS of the client is turned off.

Figure 10:
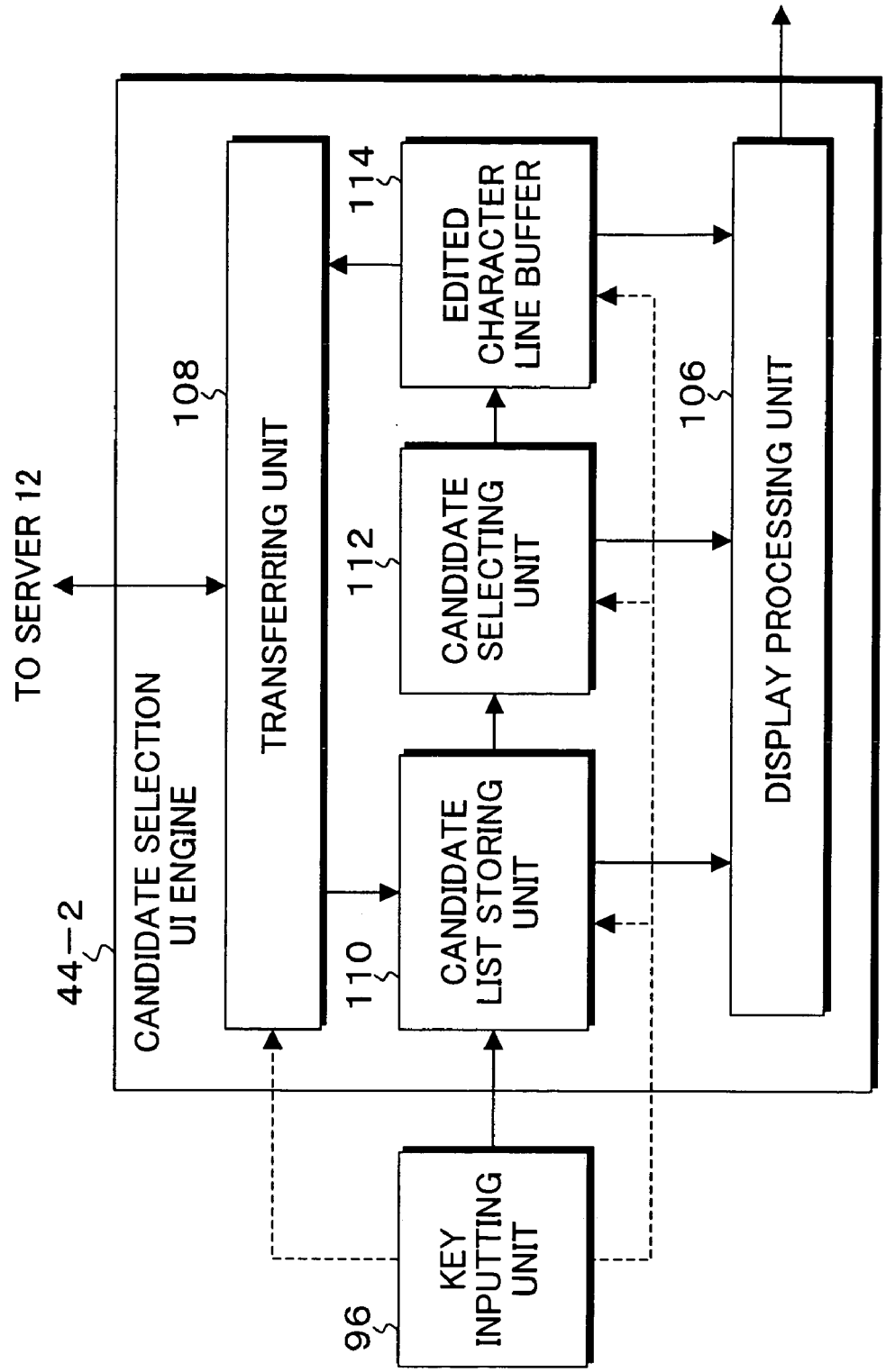
FIG. 10 is a block diagram of the functional configuration of a candidate selection UI engine sent from the server to the client.

FIG. 10 is a block diagram of the functional configuration of the candidate selection UI engine sent with the candidate list from the server to the client and, more specifically, It Is realized by execution of Java® script.

The candidate selection UI engine 44-2 is provided to the key input unit 96 and comprises a display processing unit 106 and a transferring unit 108 similarly as in FIG. 9 in addition to a candidate list storing unit 110, a candidate selecting unit 112 and a edited character string buffer 114.

The candidate list storing unit 110 stores a candidate list of HTML document objects transferred concurrently with the candidate selection UI engine 44-2 from the server. This candidate list is displayed in the candidate window 92 by the display processing unit 106 as shown in, for example, FIG. 7B.

When the candidate selection unit 112 has identified determination operation made by the pushing down of the "enter key" for a focused candidate from the key inputting unit 96, the unit 112 extracts the operating character code of the determined kanji character string from the candidate list storing unit 110 and stores It In the edited character string buffer 114 as a document object.

The document object consisting of the operating character code stored in the edited character string buffer 114 is called when operation of "transmit" button 80 provided to the application web-page is executed, and transmitted from the transferring unit 108 to the server 12.

Figure 11:
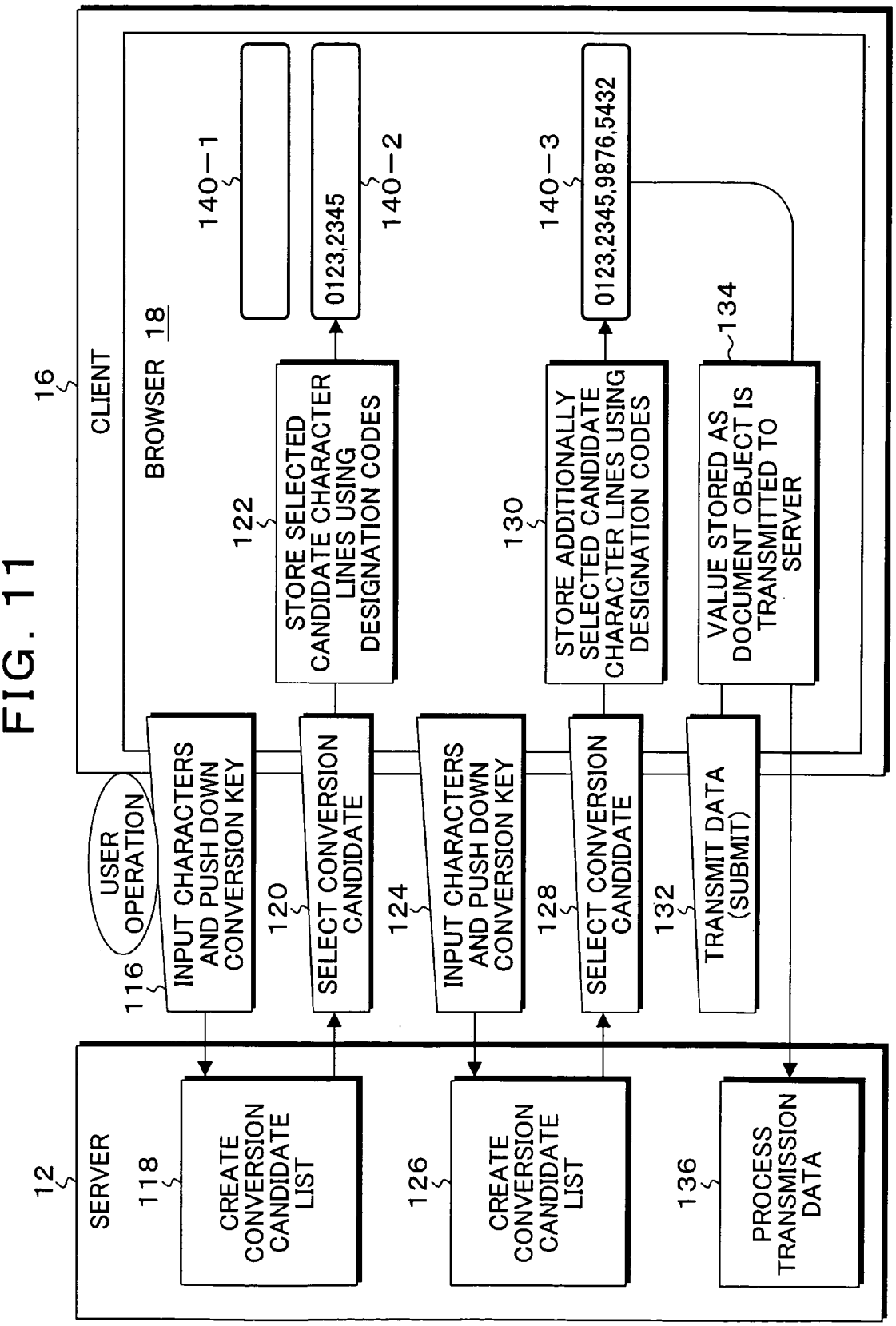
FIG. 11 illustrates an HTML data process at the client and the server.

FIG. 11 illustrates the process procedure of a HTML data process in the browser 18 of the server 12 and the client 16.

In FIG. 11, when inputting of characters and pushing down of the conversion key are executed as a process 116 in a state where the application web-page is opened by the browser 18, reading information of the inputted characters is transmitted to the server with the dictionary type and the designation information of the operating character code being the attribute information of the reading information, and is converted into kanji by a process 118. Then, a conversion candidate list is created on a HTML form consisting of the character images of the operating character code and the intermediate code and is sent to the browser side and the candidate list of the kanji character string is displayed in the candidate window.

Then, as a process 120, when the user selects a conversion candidate, the operating character code of the kanji character string selected as in the process 112 is stored as an HTML document object as shown in the character string editing buffer 140-2.

Similarly to the above, when inputting of characters and pushing down of the conversion key are executed after designating another input key of the application web-page in a process 124, a conversion candidate list creation process is executed as a process 126 of the server 12. Then, when in a process 128, when the user selects a conversion candidate as to the candidate list displayed by the browser 18, a candidate character string selected in a process 130 is additionally stored in a character string editing buffer 140-3 as an HTML document object by the operating character code.

When inputting of characters into the application web-page at the client 16 has been finished, transmission of the data is instructed by pushing the transmission button in a process 132. Then, in a process 134, the browser 18 extracts and send to the server the document object of the operating character code stored in the character string editing buffer 140-3.

In a process 136, the server 12 identifies the operation system of the transfer destination from, for example, the operating character code and executes a data transmission process for transmitting the character string of the operating character code received as the document object to the identified operation system.

Figure 12:
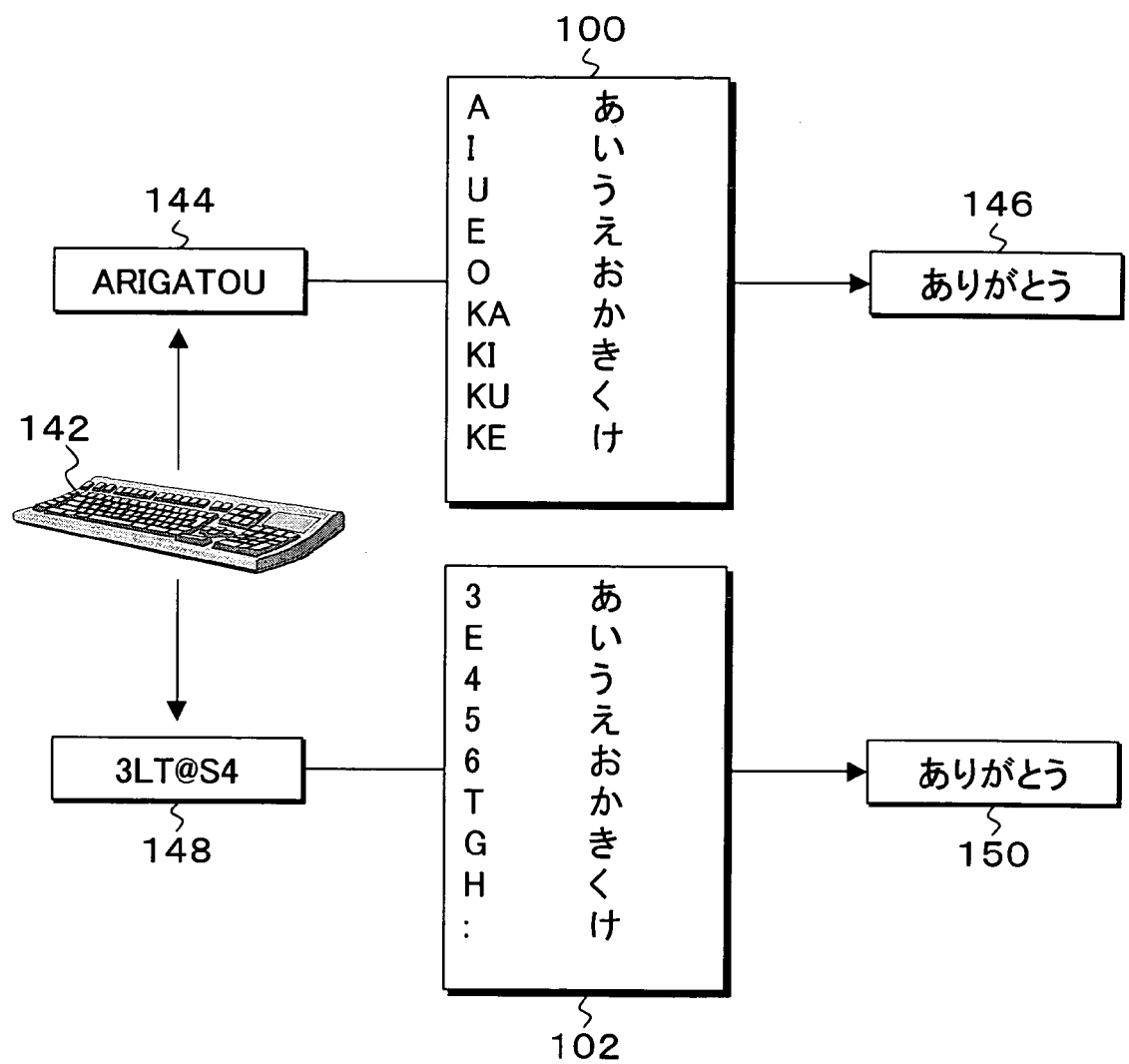
FIG. 12 illustrates a kana conversion process at the browser of the client.

FIG. 12 illustrates a kana conversion process at the browser of the client while inputting characters opening the web-page of the server 12, and the process is a function realized by executing a program of the kana conversion UI engine 44-1 shown in FIG. 9 sent from the server 12.

In FIG. 12, when characters are inputted with the keyboard of the client, either of inputting in romanized writing or kana is selected. When inputting in romanized writing is selected, a romanized writing conversion table 100 becomes effective and romanized-writing inputting of key-striking key information 144 by inputting operation of English key of the keyboard 142 is given to the romanized writing conversion table 100 and converted output of a inputted kana character string 145 is obtained.

On the other hand, when kana inputting is selected, the kana conversion table 102 becomes effective and, when inputting by keys with kana represented on the keys of the keyboard 142 is executed, this is the English key input of the key-striking key information 148 and this is inputted into the kana conversion table 102 and the converted output of an input kana character string 150 can be obtained.

Figure 13A:
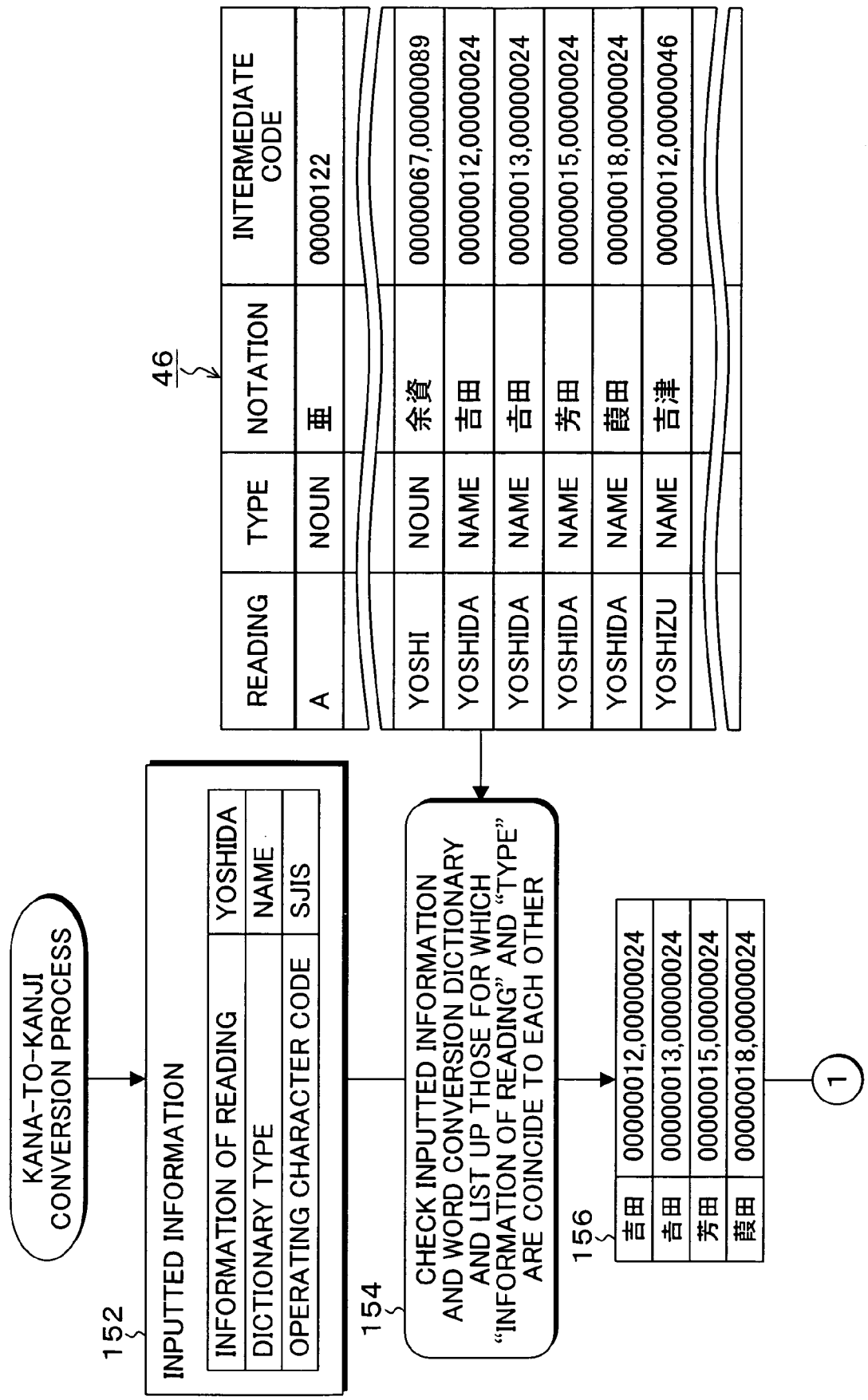

FIGS. 13A and 13B illustrate a kana-to-kanji conversion process at the kana-to-kanji conversion unit 34 provided to the server 12 shown in FIG. 1. In FIGS. 13A and 13B, in a kana-to-kanji conversion process, when the kana-to-kanji conversion unit 34 has received input information 150 from the client, the kana-to-kanji conversion table 46 is referred to in a process 154.

Input information 152 includes the information of reading information "よしだ", the dictionary type "name" and the operating character code "SJIS". In a process 154, the input information 152 and the kana-to-kanji conversion table 46 are checked and the inscription and the intermediate code for which "reading information" and "type" are coincide to each other are listed up and a conversion list 156 is created.

Next, a list 160 is created by obtaining character codes of the operating character code "SJIS" corresponding to the intermediate codes of the candidates listed up in the conversion list 156 by referring to the code conversion table 48. In this case, when no corresponding operating character code is present, the candidate having no such character code is deleted. Thereby, a kanji conversion list 162 is created including "SJIS" code being the operating character code and the intermediate code.

The designation of the dictionary type is defined to include name and address. However, in addition to them, the type of dictionaries suitable for the purpose of inputting for respective input forms can be set for each input form.

Furthermore, it is possible to manage in dictionaries the general terms in the existing databases such as, for example, listed data of the names of products stored in a product database, as the conversion candidates.

Figure 14A:
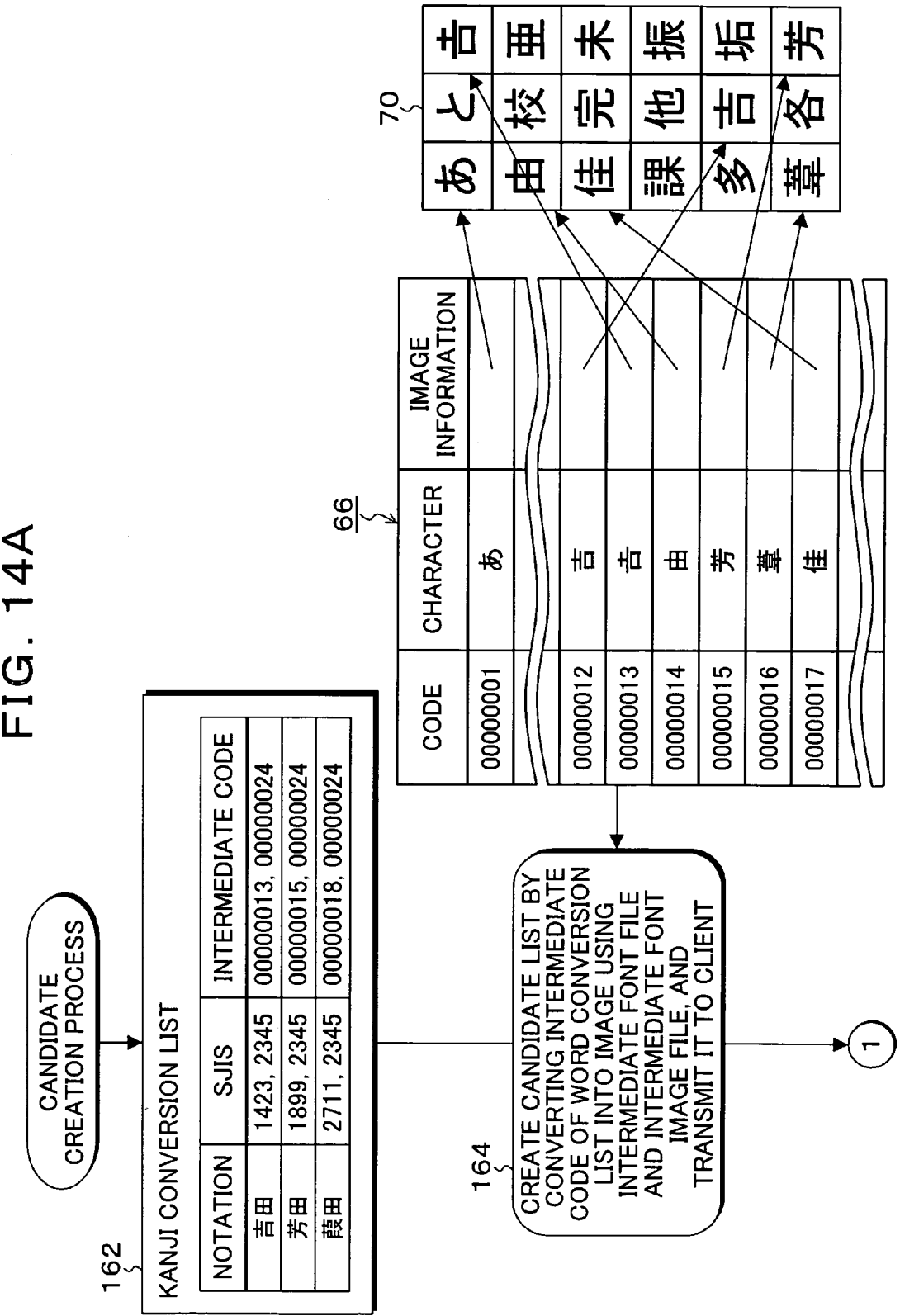
FIGS. 14A and 14B illustrate a candidate creation process during hybrid-off at the server.
Figure 14B:
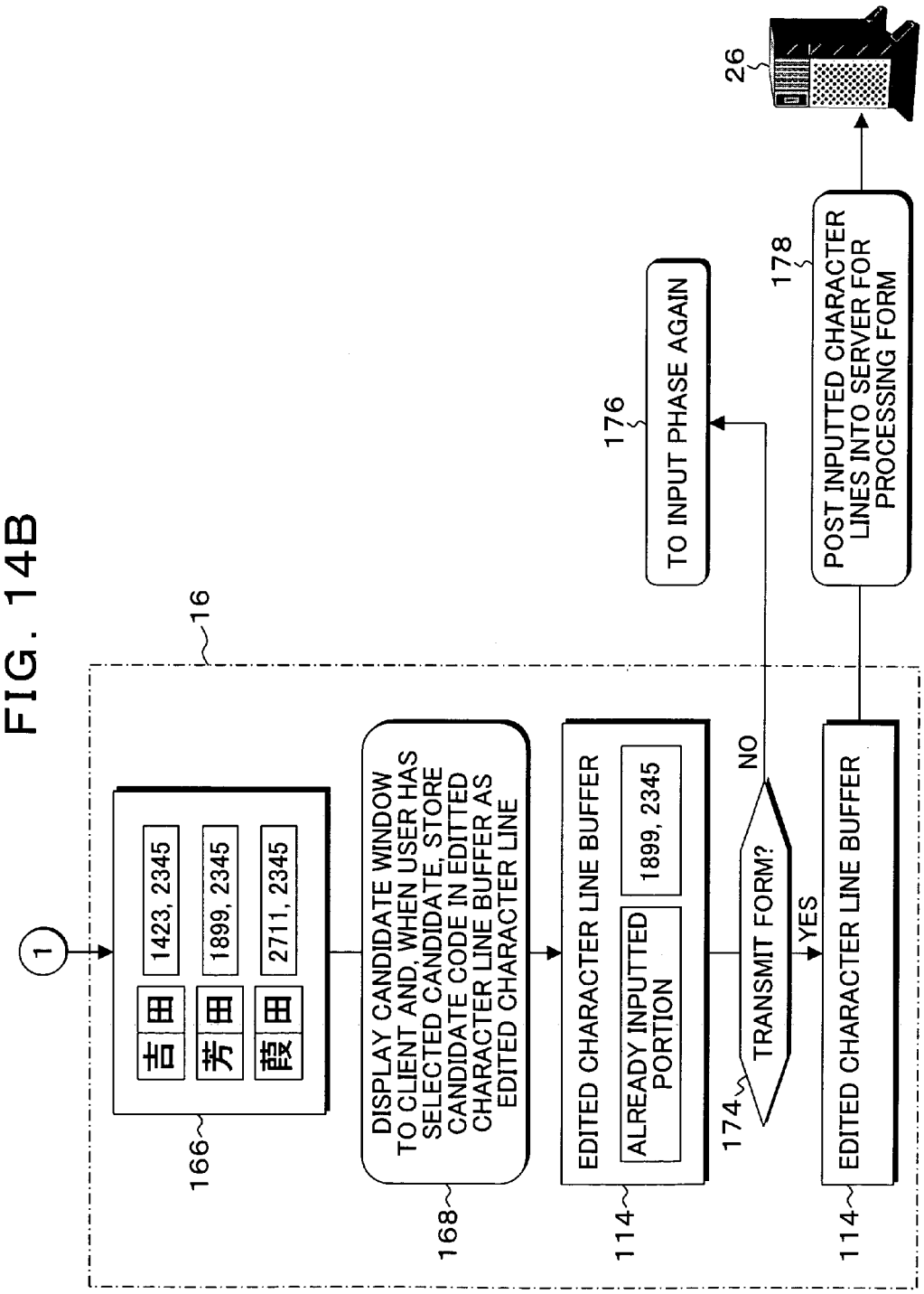

FIGS. 14A and 14B illustrate a candidate creation process for the state of hybrid-off where the candidate list is created by the server based on the kanji conversion list 162 obtained as in FIGS. 13A and 13B.

In FIGS. 14A and 14B, in the candidate creation process, the kanji conversion list 162 obtained in the kana-to-kanji conversion process is inputted and, in a process 164, each character is converted into an image from the intermediate code in the kanji conversion list using the intermediate font file 66 and the intermediate image file 70 and a candidate list 166 is created on an HTML form. The creation of the character images in the process 164 is executed by the font image creating unit 35 shown in FIG. 1.

As described above, the candidate list 166 created by the server 12 is transmitted to the client 16 and causes the client to display a candidate window as in the process 168 and, when the user has selected a candidate, stores the kanji character string code of the selected candidate in the edited character string buffer 114. Surely, when the candidate has been selected, a determined kanji character string is displayed in the input area of the application web-page.

Then, in a process 174, whether form transmission is present or absent is checked and, if form transmission is absent, in a process 176, the process returns to the input phase of kana conversion in FIG. 12 again. If form transmission is determined in a process 174, the character string of the operating character code stored as the document object is read out from the edited character string buffer 114 and transferred from the client 16 to the server. Then, in a process 178, the input character string from the client 16 is transmitted from the server 12 to a server processing the form, for example, the operation system 26 of "B" City.

Figure 16A:
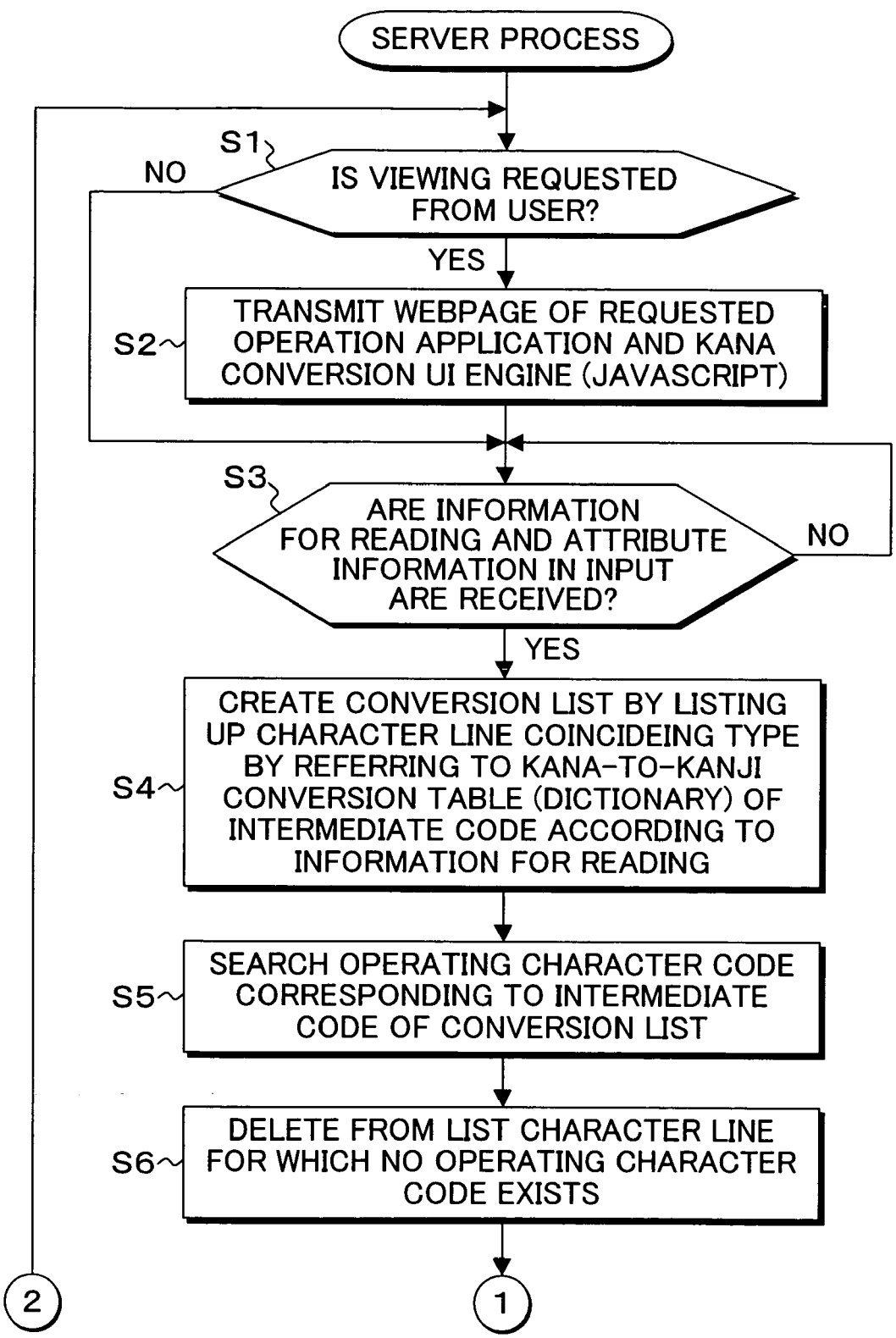
FIGS. 16A and 16B are flowcharts of a server process of the invention.
Figure 16B:
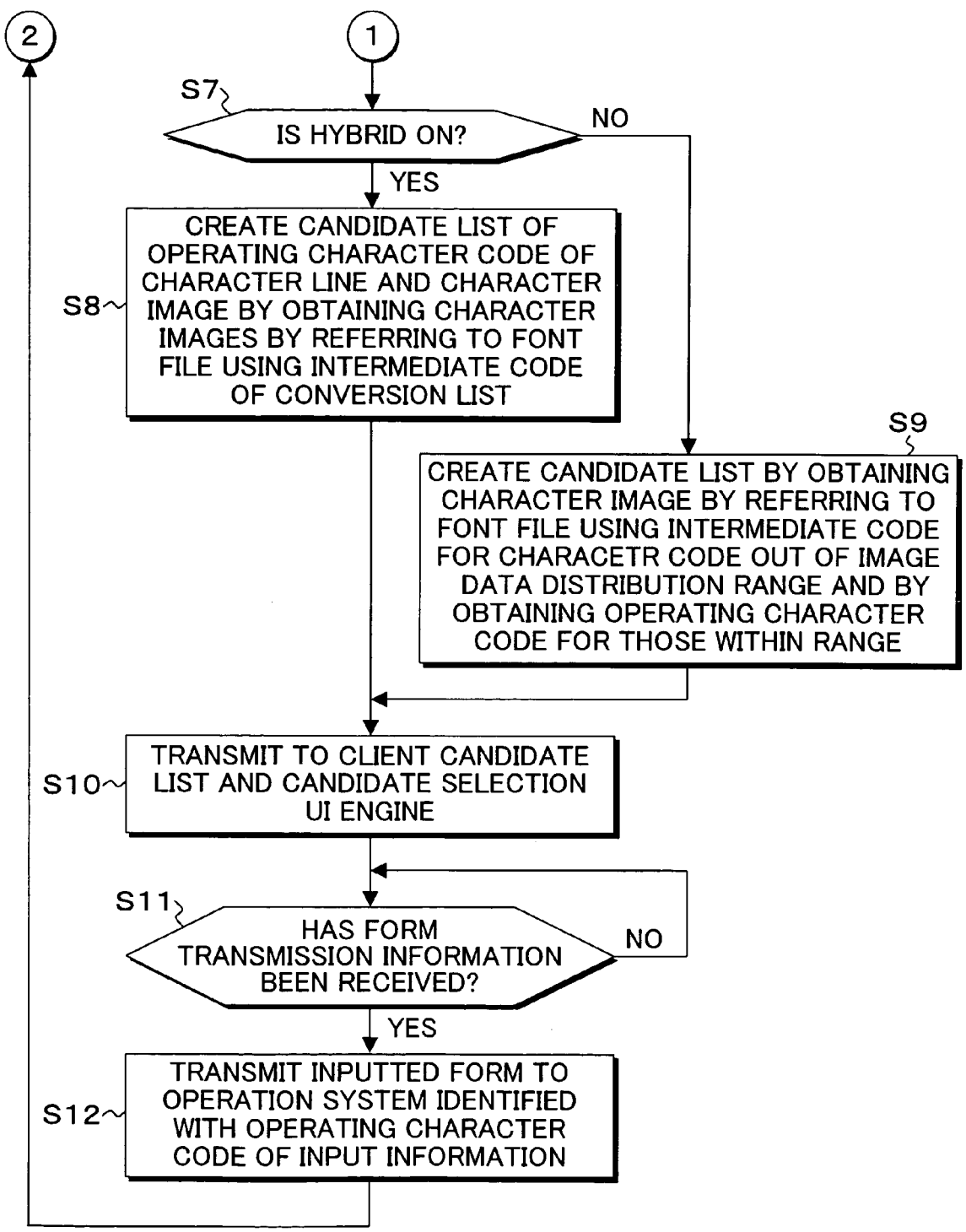

FIGS. 16 and 17 illustrate a candidate creation process for the state of hybrid-on where the candidate list is created by the server based on the kanji conversion list 162 obtained as in FIGS. 13A and 13B.

Figure 15A:
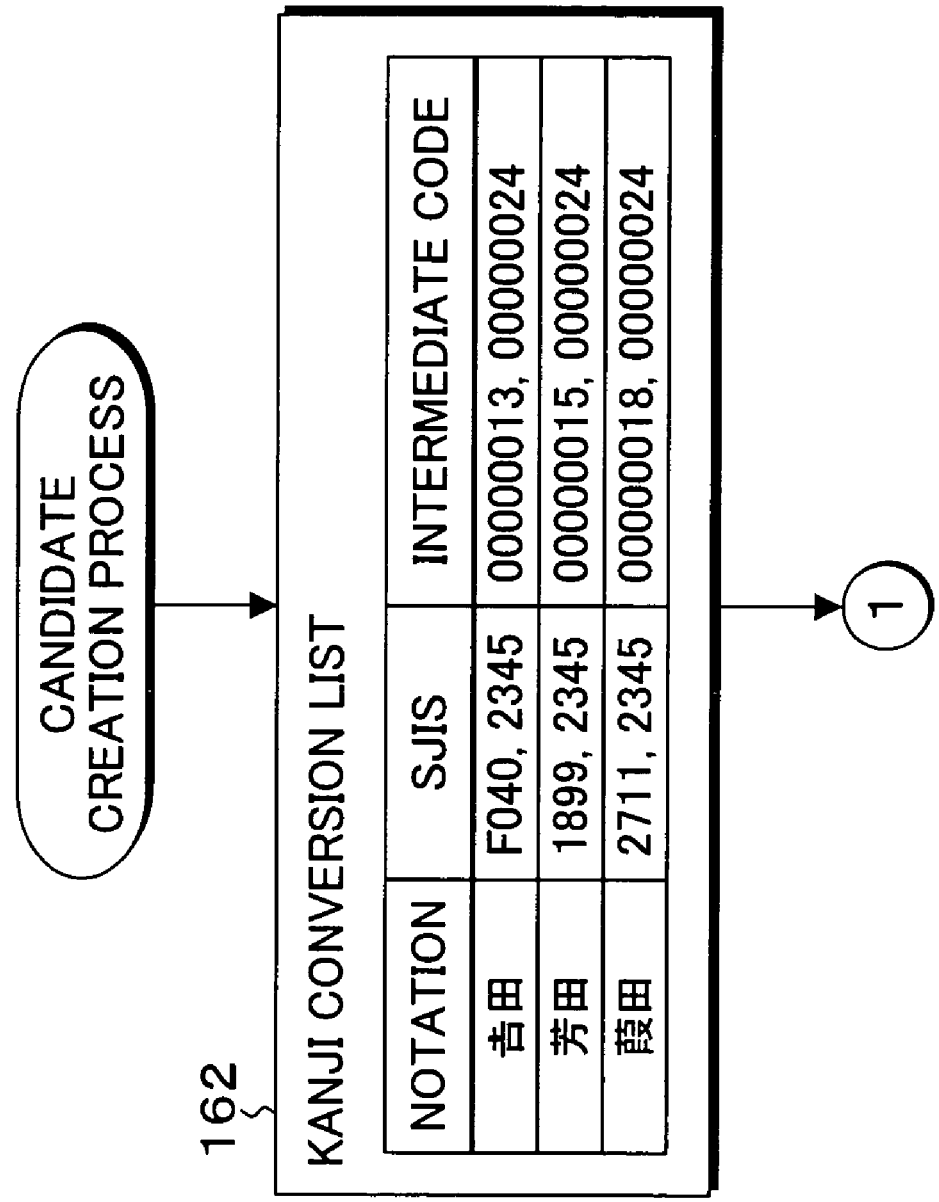
Figure 15B:
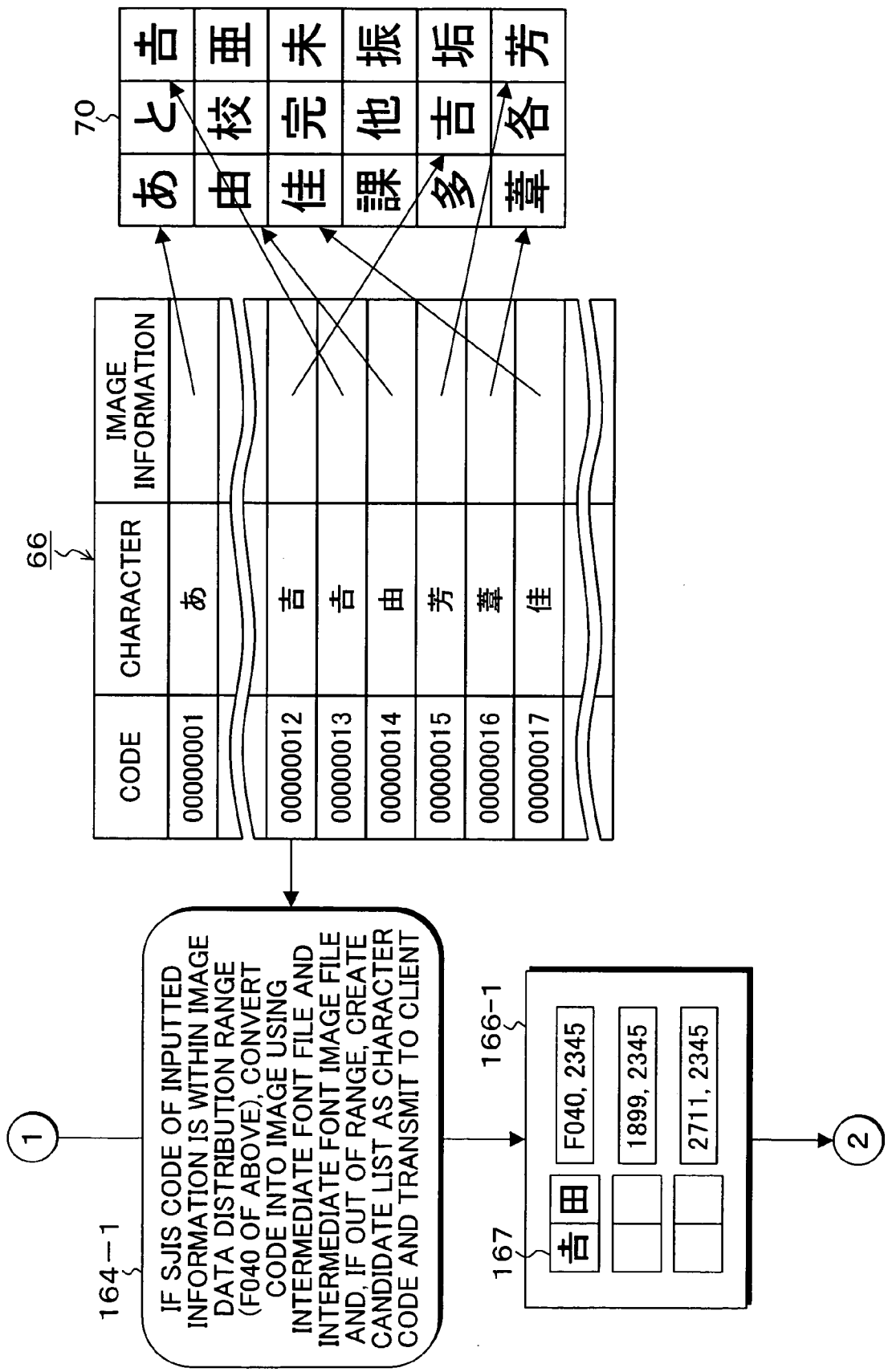

In FIGS. 15A and 15B, in the candidate creation process, the kanji conversion list 162 obtained in the kana-to-kanji conversion process is inputted and, in a process 164-1, if SJIS code of the kanji conversion list 162 is above the image data distribution range, for example, F040, each character is converted into an image from the intermediate code of the kanji conversion list 162 using the intermediate font file 66 and the intermediate font image file 70 and a candidate list 166-1 is created on the HTML form.

In this example, since the SJIS code "F040" of the kanji conversion list 162 is within the image data distribution range, the candidate list 166-1 is created on the HTML form by converting into the character images 167 using the intermediate font file 66 and the intermediate font image file 70. The SJIS code other than this are not converted into character images because they are out of the image data distribution range, and the candidate list 166-1 including only the SJIS code is created on the HTML form.

As described above, the candidate list 166-1 created by the server 12 is transmitted to the client 16 as shown in FIG. 15C and, after converting the SJIS code having no character images in the candidate list 166-1 into the character images as in the candidate list 166 using the font file of the client, the client is caused to display the candidate window as in the process 168. Then, when the user has selected a candidate, the kanji character string code of the selected candidate is stored in the edited character string buffer 114. Surely, when the candidate has been selected, the determined kanji character string is displayed in the input area of the application web-page.

Then, in a process 174, whether form transmission is present or absent is checked and, if form transmission is absent, in a process 176, the process returns to the input phase of kana conversion in FIG. 12 again. If form transmission is determined in a process 174, the character string of the operating character code stored as the document object is readout from the edited character string buffer 114 and transferred from the client 16 to the server. Then, in a process 178, the input character string from the client 16 is transmitted from the server 12 to a server processing the form, for example, the operation system 26 of "B" City.

Figure 19:
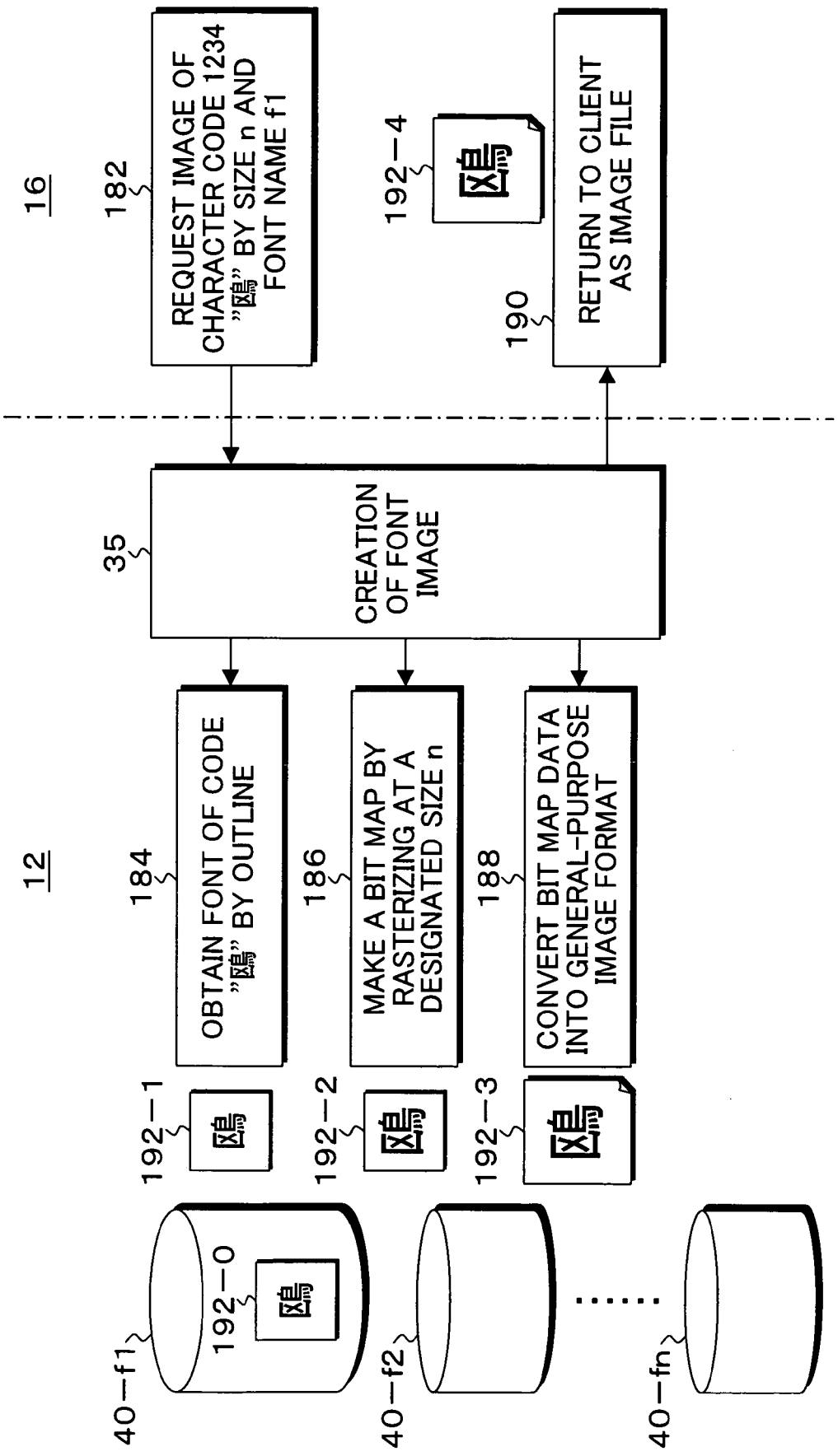
FIG. 19 illustrates the detail of a font image creation process of the invention.

FIGS. 18 and 19 are the flowcharts of a server process at the server of the invention and these flowcharts represent concurrently a process program at the server 12.

In FIGS. 18 and 19, in Step S1, a request of the client for viewing is checked. If there is such a request, the process proceeds to Step S2 and the requested web-page of the application and a kana conversion UI engine are transmitted to the client.

Then, in Step S3, receiving of reading information and attribute information if the input area is checked. If the information has been received, the process proceeds to Step S4, a kana-to-kanji conversion table of the intermediate code is referred to using the reading information and the kanji character strings for which the type coincides are listed up and a conversion list is created.

Then, in Step S5, an operating character code of the kanji character string corresponding to the intermediate code in the conversion list is searched in the code conversion table and added to the list. Then, in Step S6, the kanji character string for which no operating character code is present is deleted from the list.

Next, in Step S7, whether hybrid is on or off is checked. If it is off, the process proceeds to Step S8 and character images are obtained referring to a font file using the intermediate cod in the conversion list and a candidate list of the operating character code of the kanji character string and character images is created on the HTML form. Then, in Step S10, the candidate list and the candidate selection UI engine are transmitted to the client.

On the other hand, when hybrid-on is determined in Step S7, the process proceeds to Step S9 and character images are obtained for the operating character code within the image data distribution range by referring to the font file by the intermediate code of the conversion list. On the other hand, the operation character code itself is obtained for the operating character code out of the range without obtaining the character images and a candidate list of a kanji character string containing both of them is created on the HTML form. Then, the candidate list and the candidate selection UI engine are transmitted to the client in Step S10.

Then, receiving of form transmission information is checked in Step S11. If the form transmission information is received, in Step S12, the operation system of the transfer destination is identified from the operating character code in the received form and is transferred to the operation system for which the character string of the operating character code has been identified.

Figure 17A:
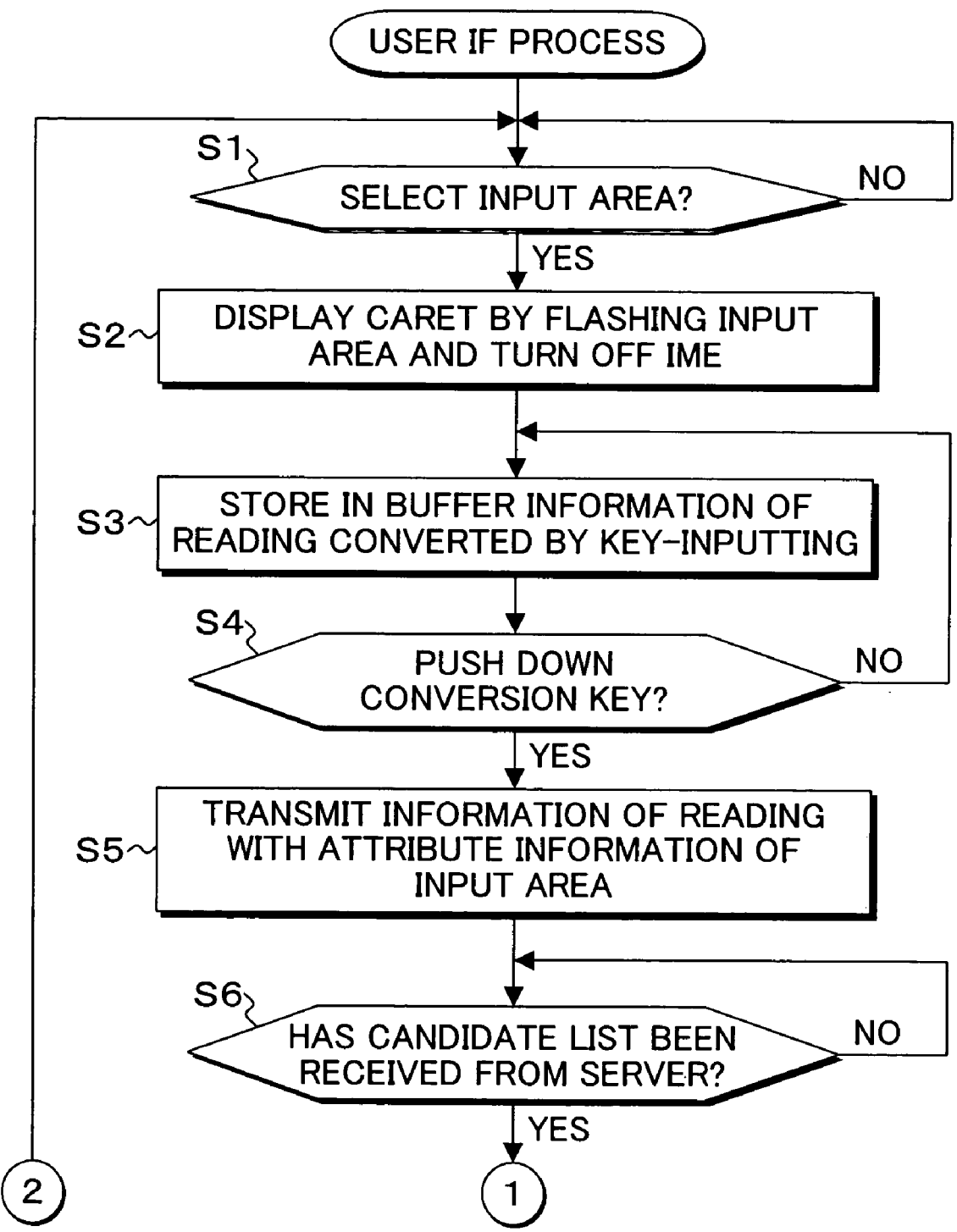
FIGS. 17A and 17B are flowcharts of a browser process by UI engine executed after being sent to the browser of the client.
Figure 17B:
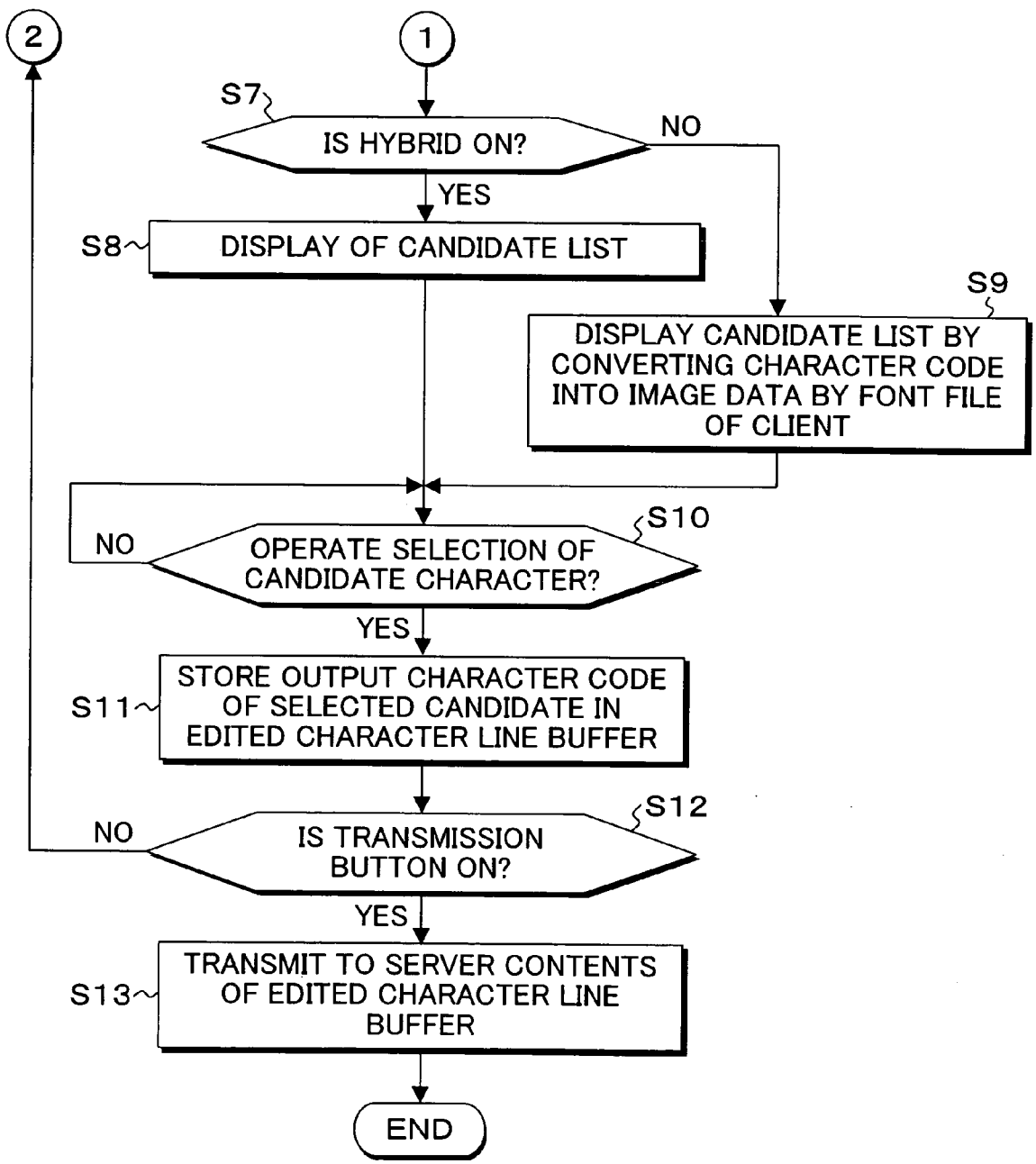

FIGS. 17A and 17B are flowcharts of a browser process by a UI engine sent from the server 12 to and executed at the browser of the client. This browser process is divided into a process by the kana conversion UI engine 44-1 shown in FIG. 9 and a process by the candidate selection UI engine 44-2 shown in FIG. 10, however, both of them are shown coupled in the flowchart shown in FIGS. 17A and 17B. Therefore, the flowchart shown in FIGS. 17A and 17B represents the process procedures of the character input program and the candidate selection program sent from the server to the client and executed at the browser.

The browser process shown in FIGS. 17A and 17B is executed in a state where the application web-page is opened. If selection of the input area is determined in Step S1, the input area is flashed and the caret 88 is displayed as shown in FIG. 7A and, concurrently, the Japanese input program IME provided on the OS of the client is turned off in Step S2.

Then, in Step S3, reading information converted by key input is stored in the buffer and kana is displayed in the kana input window of the input position. Then, in Step S4, pushing down of "conversion key" is checked. When the "conversion key" has been pushed down, the reading information is transmitted to the server 12 with attribute information of the input position in Step S5. This process during the Step S1-S5 corresponds to the process of the kana conversion UI engine 44-1 shown in FIG. 9.

Then, receiving of the candidate list of the kanji character string from the server 12 is checked in Step S6. When the candidate list has been received, hybrid-on is checked in Step S7. If it is off, the candidate list of the kanji character string is displayed in the candidate window in Step S8.

On the other hand, if the hybrid-on is determined in Step S7, an operating character code in the candidate list is converted into image data using the font file of the client in Step S9. Thereafter, the candidate list of the kanji character string is displayed in the candidate window.

Then, selection operation of the candidate character string is checked in Step S10. When selection operation of the kanji character string has been executed, the process proceeds to Step S11 and operating character code of the selected kanji character string is stored in the edited character string buffer.

Then, being on of the "transmit" button is checked in Step S12. When the "transmit" button is not on, the process returns to the Step S1 and character input is continued. When being on of the "transmit" button has been determined in Step S12 after inputting of all the characters has been finished, the contents of the edited character string buffer, i.e., the character string of the operating character code to be the HTML document object is transmitted to the server 12 in Step S13.

FIG. 18 illustrates the process of the font image creation unit 35 provided to the server 12 shown in FIG. 1 with the process of the kana-to-kanji conversion unit 34. In FIGS. 17A and 17B, when the reading of, for example, "おうがい" has been inputted and the enter key has been pushed down on the application web-page being viewed by the browser 18 of the client 16, reading information 180-1 is sent to the server 12 and is converted into a kanji character string of " " by the kana-to-kanji conversion unit 34.

鴎外 A font image creation request is added internally to this reading information 180-1 from the client 16. The font image creation request contains the following.

(1) designation of the font image creation unit 35 being a program on the server,
(2) designation of the font size,
(3) designation of the character code to create the font image, and
(4) designation of the font name to determine the font type.

The font image creation unit 35 obtains an outline font from the font file 40 using a kanji character string 180-2 and converts it into an image in a designated size, thereafter, converts the image into an image file in, for example, PNG format, transmits it to the client 16 and causes the client 16 to display it.

FIG. 19 shows further in detail the font image creation process shown in FIG. 18. When a character image is needed in a process 182, the client 16 requests an image of, for example, "鴎外" of character code 1234 to the server 12 in the size n and with the font name of F1.

Figure 20:
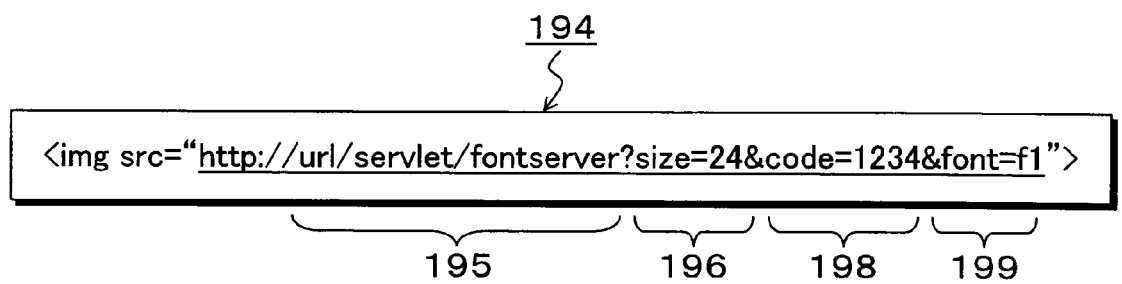
FIG. 20 illustrates a font image creation request from the client.

FIG. 20 shows an specific example of a font image creation request from the client. A font image creation request 194 is a request for a URL for character image display to the server 12 and describes the URL of a servlet as an image source in the HTML. That is, in the font image creation request 194, "url/servlet/fontserver" is described as a program name 195, then, "size=24" is described indicating 24-point as a font size 196, then, "code=1234" is described as a character code 198 and, finally, "font=f1" is described as a font name 199.

The font image creation unit 35 of the server 12 having received the font image creation request 194 obtains a font 192-1 of a character code "鴎" kana-to-kanji-converted as in FIG. 19 by referring to an outline font table 40-f1 designated with the font name, f1 among outline font tables 40-f1 to 40-fn prepared for each font name storing the font of a character code "鴎" kana-to-kanji-converted, as general-purpose outline fonts such as "True Type".

Then, in a process 186, a bit map data 192-2 is created by making a bit map by rasterizing with the designated size of n=24. Then, in a process 188, the bit map data 192-2 is converted into an image file 192-3 in a general-purpose image format such as, for example, PNG and is sent to the client 16. In a process 190, the client 16 displays a character image 194 on the web based on the image file 192-3 in a general-purpose image format received from the server 12.

Figure 21:
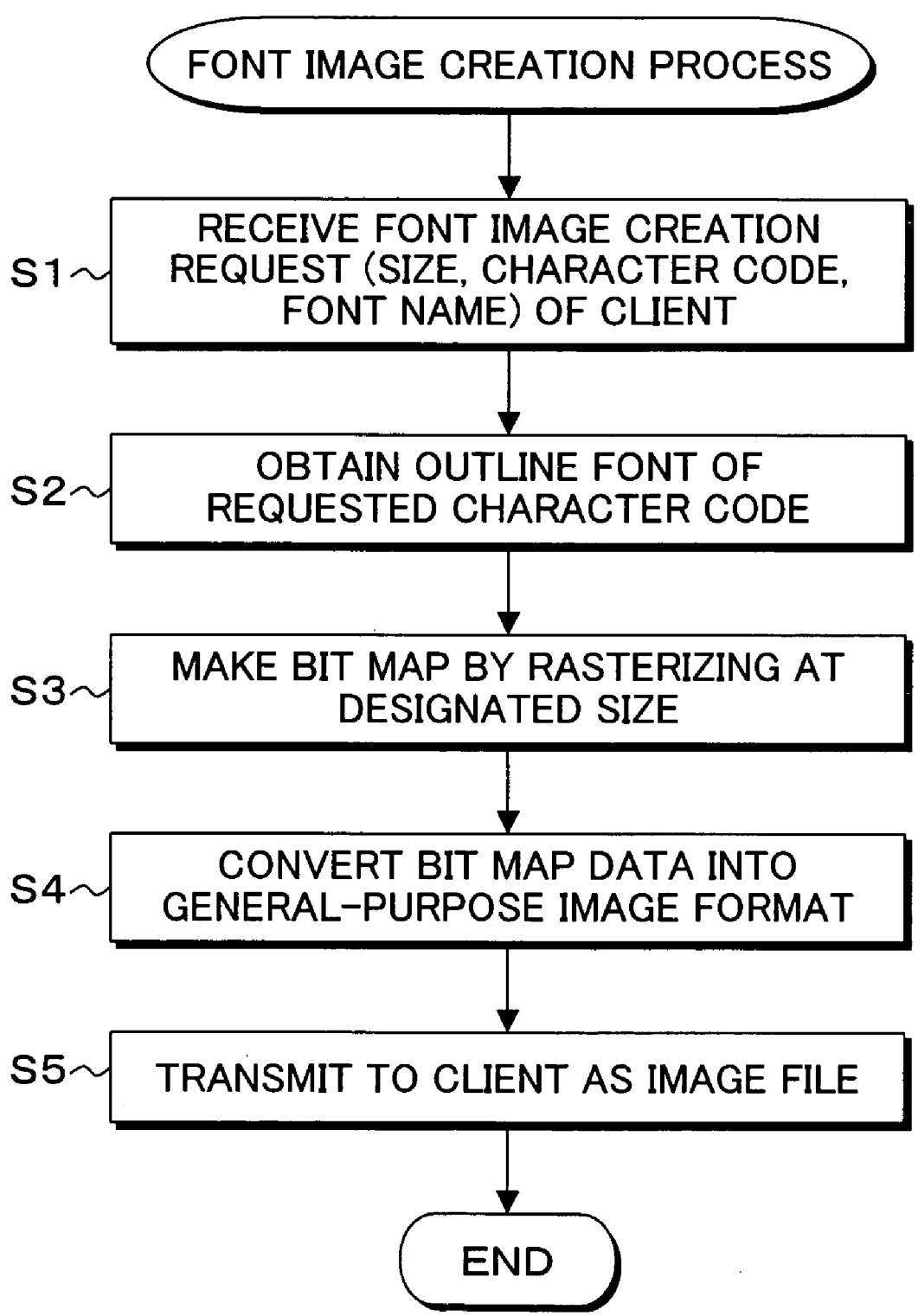
FIG. 21 is a flow chart of the font image creation process of the invention.
Figure 22:
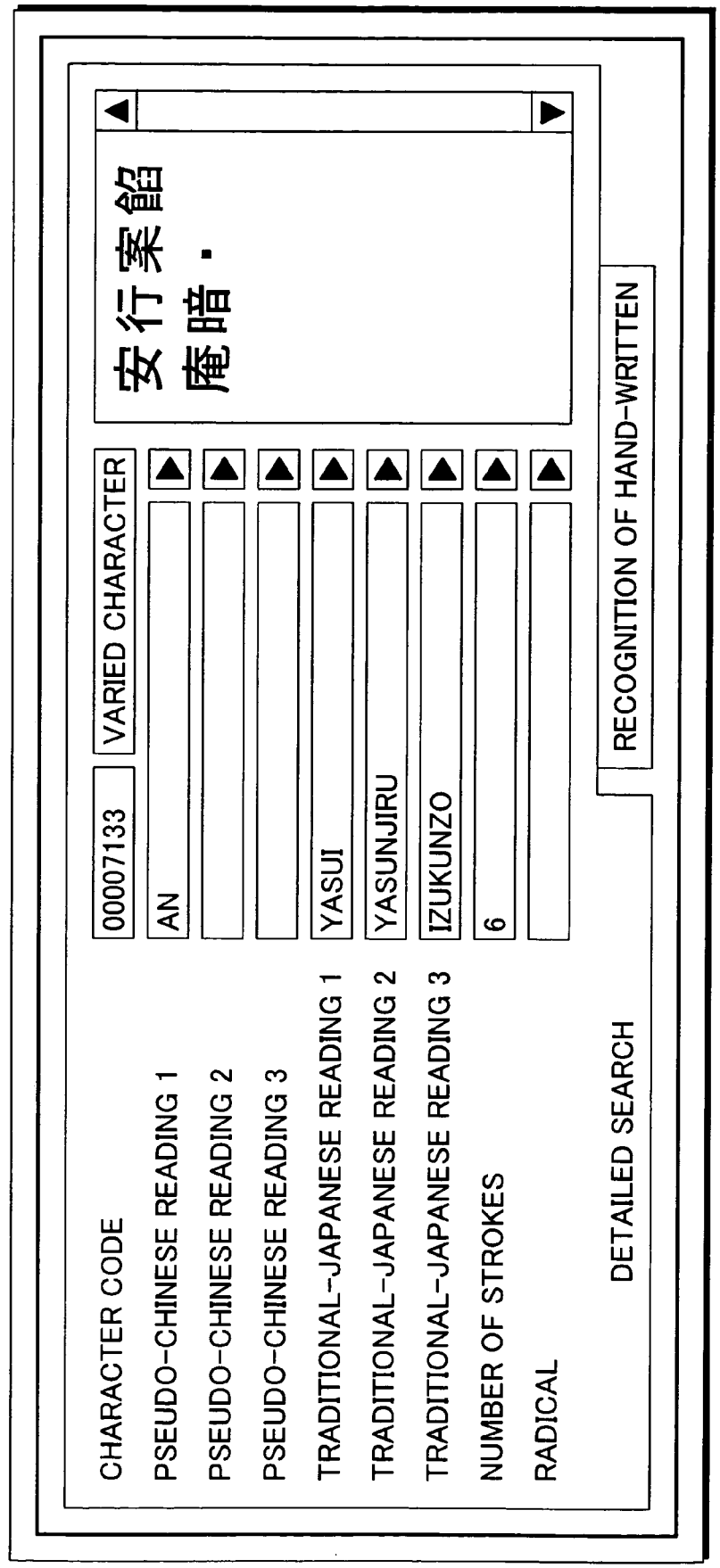
FIG. 22 illustrates a character input process other than the kana-to-kanji conversion.

FIG. 21 is a flowchart showing the process procedure by the font image creation unit 35 provided to the server 12 shown in FIG. 1. In FIG. 20, when the unit 35 receives the font image creation request from the client in Step S1, the unit 35 obtains an outline font designated with a font name of the requested character cod after kana-to-kanji conversion in Step S2 and creates bit map data by rasterizing in a designated size in Step S3.

Then, the bit map data is converted into an image file in the general-purpose image data format such as PNG in Step S4 and the image file is transmitted to the client and the client is caused to display a character image on the web-page in Step S5.

FIG. 21 illustrates a character input process for the case other than the kana-to-kanji conversion according to the invention. As the character input process for the case other than the kana-to-kanji conversion, the following can be realized.

(1) search of character codes,
(2) search of the pseudo-Chinese reading,
(3) search of the traditional Japanese reading,
(4) search of the number of strokes,
(5) search of radicals, and
(6) search of hand-written strokes.

Process functions for converting kana into kanji other than the case for the kana-to-kanji conversion are realized by, similarly to the case of the kana-to-kanji conversion, the program process of Java® script constituting the character input UI engine sent when a web-page of the server is opened from the client.

In the above embodiment, as attribute information of input frame of the application web-page provided from the server 12 to the client, the case where the operating character code corresponding to a code system of the transfer destination of the application web-page is set fixedly is taken as an example. However, in the server of the invention, since code systems can be handled programmable, the designation of the operating character code in the attribute information set in, for example, an input frame of the application web-page can also be dynamically changed in the process by an arbitrary program.

For example, even in the case of application web-pages having the same application contents, when the acceptance of them are different in terms of term between the operation system 20 of "A" City and the operation system 26 of "B" City, the JEF code supporting the operation system 20 of "A" City is set in the attribute information as the operating character code for a certain term and the SJIS code supporting the operation system 26 of "B" City is designated as the operating character code of the attribute information for another term. Thereby, it is possible to input integratedly the characters of different code systems corresponding programmablly to different code systems utilizing the same web-page.

Furthermore, the above embodiment takes a system integrating a plurality of self-governing body systems as an example. However, the invention is not limited to this and can be applied as it is to character inputting integrating a plurality of systems respectively in different code systems. Operation systems other than the operation systems of self-governing bodies includes, for example, the following.
(1) a integrated operation system of a plurality of operating codes for consolidation of operation of a plurality legal corporations having used respectively different operating codes,
(2) a integrated operation system in the same legal corporation integrating operation of sections respectively using different operating codes,
(3) a integrated operation system in the same self-governing body integrating operation of sections using respectively using different operating codes, and
(4) an ordinary operation system enabling inputting with operating codes different for each input area on an input screen.

Furthermore, the above embodiment takes a case supporting Japanese as an example, however, it can be applied to any arbitrary language as it is when the language is any language for which it is necessary to convert characters by inputting reading information of a character string similarly to Japanese. As such languages conversion, Chinese character conversion and Korean character conversion that need to conversion to kanji corresponding to reading input can be listed and the invention can be applied as it is to character inputting/editing of such languages other than Japanese.

More specifically, the invention can be applied as it is to the languages needing IME in WINDOWS®.

Furthermore, the above embodiment takes the case where the hybrid mode is turned on or off for each client respectively under by the setting of the server 12 made by a system manager as an example. However, the form where the hybrid processing unit 240 is not provided to the server 12 and the form where the hybrid processing unit 240 is fixedly provided to the server 12 may be applicable.

Furthermore, the present invention includes any variations without impairing the object and advantages thereof and is not limited by the numerical values indicated in the above embodiments.

What is claimed is:

1. A computer-readable medium storing a program allowing a computer, operating as a server as an operation system and handling as the operation system operating character code a plurality of different character codes, to execute:
    a kana-to-kanji conversion comprising:
        receiving, from a client, kana information comprising an input character string for which an operating character code has been designated,
        converting the kana information into a kanji character string of an intermediate code and a kanji character string of the operating character code,
        creating a candidate list of a kanji character string comprising character images of the operating character code and the intermediate code, and
        sending the candidate list together with a candidate selection program to the client, causing the client to select a character string of a kanji candidate; and
    an editing/outputting comprising:
        receiving an operating character code of the selected kanji character string from the client; and
        transferring the received operating character code to a corresponding operation system.

2. The computer-readable medium according to claim 1, further comprising:
    sending character inputting data and a character inputting program to the client, wherein
    the character inputting program is started up by a designated operation in an input area of the character inputting web-page and the character inputting program stops the client's OS-based character inputting operation.

3. The computer-readable medium according to claim 1, wherein the intermediate code is a large-scale code including a plurality of operating character codes, and wherein the kana-to-kanji conversion includes:
    referring to a kana-to-kanji conversion table in which large-scale codes are registered, and acquiring a large-scale code of a kanji character string corresponding to kana reading information of an inputted character string; and
    referring to a code conversion table in which the plurality of operating character codes are registered corresponding to the large-scale codes, and acquiring an operating character code corresponding to the large-scale code of the kanji character string.

4. The computer-readable medium according to claim 1, wherein the kana-to-kanji conversion includes:
    receiving, from the client, kana reading information of the inputted character string for which a type of dictionary used is designated in addition to the designation of the operating character code, and creating a candidate list of a kanji character string consisting of character images of the operating character code and the intermediate code.

5. The computer-readable medium according to claim 1, wherein the kana-to-kanji conversion includes:
creating a candidate list of a kanji character string for which both of the intermediate code and the operating character code have been obtained, and sending the created candidate list to the client.

6. The computer-readable medium according to claim 1, wherein the kana-to-kanji conversion further comprises:
creating a font image, when a font image creation request of a character code is received from the client that includes designation of a font size in addition to kana information of the input character string for which an operating character code has been designated, by:
acquiring an outline font of the requested character code from a font file and converting the acquired outline font into an image;
converting the image into an image file in a predetermined image format; and
sending the image file to the client for display.

7. The computer-readable medium according to claim 1, wherein the candidate selection program sent to the client together with the candidate list in the kana-to-kanji conversion causes the client to store the operating character code of the kanji character string selected from the candidate list in an edited character string buffer and to transmit to the server the kanji character string of the operating character code stored in the edited character string buffer after determining the transmitting operation of the character inputting webpage.

8. The computer-readable medium according to claim 2, wherein the character inputting program sent to the client comprises an input-support display function including display of input areas and display of inputting positions necessary for character inputting.

9. The computer-readable medium according to claim 2, wherein the character inputting program sent to the client converts kana into kanji through searches of key words including reading, character code, the number of strokes, variation of a character, radical, part or hand-written strokes.

10. The computer-readable medium according to claim 1, wherein the kana-to-kanji conversion includes, when a hybrid mode is designated that uses font files of both of the server and the client, converting only the operating character codes in a range defined in advance into character images of the intermediate code, and sending intactly the operating character codes out of the range to the client for conversion into character images.

11. A character inputting and editing method for a server as an operation system handling as the operation system operating character code a plurality of different character codes, the method comprising:
a kana-to-kanji conversion, comprising:
receiving, from a client, kana information of an input character string for which an operating character code has been designated,
converting the kana information into a kanji character string of an intermediate code and a kanji character string of the operating character code,
creating a candidate list of a kanji character string comprising character images of the operating character code and the intermediate code, and
sending the candidate list together with a candidate selection program to the client, and causing the client to select a character string of a kanji candidate; and
an editing/outputting, comprising:
receiving an operating character code of the selected kanji character string from the client, and
transferring the received operating character code to a corresponding operation system.

12. A server apparatus as an operation system handling as the operation system operating character code a plurality of different character codes, the server apparatus comprising:
a computer, comprising:
a kana-to-kanji converter,
operable to receive, from a client, kana information of an input character string for which an operating character code has been designated,
operable to convert the kana information into a kanji character string of an intermediate code and a kanji character string of the operating character code,
operable to create a candidate list of a kanji character string comprising character images of the operating character code and the intermediate code, and
operable to send the candidate list together with a candidate selection program to the client, and causing the client to select a character string of a kanji candidate; and
an editor/outputter,
operable to receive an operating character code of the selected kanji character string from the client, and
operable to transfer the received operating character code to a corresponding operation system.

13. A server in communication with a client comprising:
a computer comprising;
A receiver receiving, from the client, a kana input character string;
a converter converting the kana input character string into a kanji intermediate code and a kanji operating character code;
a creator creating a candidate list comprising character images of the kanji operating character code and the kanji intermediate code; and
a sender sending the candidate list and a candidate selection program to the client.

* * * * *

UNITED STATES PATENT AND TRADEMARK OFFICE
CERTIFICATE OF CORRECTION

PATENT NO. : 7,272,792 B2 Page 1 of 1
APPLICATION NO. : 10/767455
DATED : September 18, 2007
INVENTOR(S) : Takashi Furuta et al.

It is certified that error appears in the above-identified patent and that said Letters Patent is hereby corrected as shown below:

Column 24, Line 45, change "comprising;" to --comprising:--.

Column 24, Line 46, change "A" to --a--.

Signed and Sealed this

Sixth Day of May, 2008

JON W. DUDAS
*Director of the United States Patent and Trademark Office*